United States Patent
Lee et al.

(10) Patent No.: US 9,853,793 B2
(45) Date of Patent: *Dec. 26, 2017

(54) METHOD AND APPARATUS OF TRANSMITTING CONTROL INFORMATION IN WIRELESS COMMUNICATION SYSTEM

(75) Inventors: Moon Il Lee, Gyeongki-do (KR); So Yeon Kim, Gyeondki-do (KR); Jae Hoon Chung, Gyeongki-do (KR); Hyun Soo Ko, Gyeongki-do (KR); Seung Hee Han, Gyeongki-do (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/056,223

(22) PCT Filed: Jul. 30, 2009

(86) PCT No.: PCT/KR2009/004266
§ 371 (c)(1),
(2), (4) Date: Jan. 27, 2011

(87) PCT Pub. No.: WO2010/013963
PCT Pub. Date: Feb. 4, 2010

(65) Prior Publication Data
US 2011/0141941 A1    Jun. 16, 2011

Related U.S. Application Data

(60) Provisional application No. 61/084,992, filed on Jul. 30, 2008, provisional application No. 61/226,756, filed on Jul. 20, 2009.

(30) Foreign Application Priority Data

Oct. 10, 2008    (KR) .......................... 10-2008-0099671

(51) Int. Cl.
*H04L 5/00*    (2006.01)
*H04L 1/00*    (2006.01)
(Continued)

(52) U.S. Cl.
CPC .......... *H04L 5/0055* (2013.01); *H04L 1/0031* (2013.01); *H04L 1/0038* (2013.01);
(Continued)

(58) Field of Classification Search
None
See application file for complete search history.

(56) References Cited

U.S. PATENT DOCUMENTS 5,936,967 A    8/1999    Baldwin et al.
7,940,795 B2    5/2011    Frederiksen et al.
(Continued)

FOREIGN PATENT DOCUMENTS

CN    1409562 A    4/2003
JP    10178436 A    6/1998
(Continued)

OTHER PUBLICATIONS

Office Action dated Feb. 21, 2014, issued by the Japanese Patent Office for Japanese Patent Application No. 2012-189838 (English Machine Translation).*
(Continued)

*Primary Examiner* — Joshua Kading
(74) *Attorney, Agent, or Firm* — Morgan, Lewis & Bockius LLP

(57) ABSTRACT

A method and an apparatus of transmitting control information in a wireless communication systema are provided. The method includes transmitting first control information and second control information through an uplink component carrier (UL CC), wherein the first control information is for (Continued)

a first downlink component carrier (DL CC), and the second control information is for a second DL CC.

8 Claims, 13 Drawing Sheets

(51) Int. Cl.
  *H04L 23/02* (2006.01)
  *H04L 27/26* (2006.01)
  *H04L 1/18* (2006.01)
(52) U.S. Cl.
  CPC ............ *H04L 5/001* (2013.01); *H04L 5/0053* (2013.01); *H04L 5/0057* (2013.01); *H04L 5/0094* (2013.01); *H04L 23/02* (2013.01); *H04L 27/2613* (2013.01); *H04L 1/0026* (2013.01); *H04L 1/1861* (2013.01)

(56) References Cited

U.S. PATENT DOCUMENTS

| | | | |
|---|---|---|---|
| 7,953,167 | B2 | 5/2011 | Ode et al. |
| 2003/0063620 | A1 | 4/2003 | You et al. |
| 2003/0117980 | A1 | 6/2003 | Kim et al. |
| 2004/0028011 | A1 | 2/2004 | Gehring et al. |
| 2004/0196793 | A1 | 10/2004 | Lucidarme et al. |
| 2005/0003768 | A1 | 1/2005 | Laroia et al. |
| 2005/0227628 | A1 | 10/2005 | Inanoglu |
| 2006/0009230 | A1 | 1/2006 | Fukumoto et al. |
| 2006/0111129 | A1 | 5/2006 | Ihm et al. |
| 2006/0153155 | A1 | 7/2006 | Jacobsen et al. |
| 2006/0281465 | A1 | 12/2006 | McBeath et al. |
| 2007/0264994 | A1 | 11/2007 | Schwarz et al. |
| 2008/0075060 | A1 | 3/2008 | Tiirola et al. |
| 2008/0080423 | A1 | 4/2008 | Kolding et al. |
| 2008/0095106 | A1* | 4/2008 | Malladi et al. ............... 370/329 |
| 2008/0095110 | A1* | 4/2008 | Montojo et al. ............. 370/330 |
| 2008/0117891 | A1 | 5/2008 | Damnjanovic et al. |
| 2008/0159323 | A1 | 7/2008 | Rinne et al. |
| 2008/0207150 | A1 | 8/2008 | Malladi et al. |
| 2008/0273479 | A1 | 11/2008 | Kwak et al. |
| 2008/0298450 | A1 | 12/2008 | Zhang et al. |
| 2008/0316959 | A1 | 12/2008 | Bachl et al. |
| 2008/0320354 | A1 | 12/2008 | Doppler et al. |
| 2009/0046637 | A1 | 2/2009 | Kim et al. |
| 2009/0103562 | A1 | 4/2009 | Frederiksen et al. |
| 2009/0129259 | A1* | 5/2009 | Malladi et al. ............... 370/210 |
| 2009/0257533 | A1* | 10/2009 | Lindoff et al. ................ 375/344 |
| 2009/0268693 | A1* | 10/2009 | Lindh et al. .................. 370/336 |
| 2009/0300456 | A1 | 12/2009 | Pelletier et al. |
| 2010/0002647 | A1 | 1/2010 | Ahn et al. |
| 2010/0008317 | A1* | 1/2010 | Bhattad et al. ............... 370/329 |
| 2010/0088580 | A1 | 4/2010 | Chun et al. |
| 2010/0128687 | A1 | 5/2010 | Oteri et al. |
| 2010/0135173 | A1* | 6/2010 | Tynderfeldt et al. ......... 370/252 |
| 2010/0144282 | A1 | 6/2010 | Laroia et al. |
| 2010/0232373 | A1 | 9/2010 | Nory et al. |
| 2010/0317360 | A1 | 12/2010 | McBeath et al. |
| 2011/0059767 | A1 | 3/2011 | Parkvall et al. |
| 2017/0006602 | A1* | 1/2017 | Kwon .................. H04L 1/0029 |

FOREIGN PATENT DOCUMENTS

| | | |
|---|---|---|
| JP | 2005354537 A | 12/2005 |
| JP | 2011-525750 A | 9/2011 |
| JP | 2012-520633 A | 9/2012 |
| KR | 2003-0068014 | 8/2003 |
| KR | 2004-0063059 | 7/2004 |
| KR | 2006-00092400 | 8/2006 |
| KR | 2007-0103717 | 10/2007 |
| WO | 2005/069505 | 7/2005 |
| WO | 2006/043773 A2 | 4/2006 |
| WO | 2006/046307 A1 | 5/2006 |
| WO | 2006/124204 A1 | 11/2006 |
| WO | 2008/014275 A2 | 1/2008 |
| WO | 2008/057843 A2 | 5/2008 |
| WO | 2008/084985 A2 | 7/2008 |
| WO | 2009/157861 A1 | 12/2009 |
| WO | 2010-105254 A2 | 9/2010 |

OTHER PUBLICATIONS

Motorola, "UL ACK/NACK for TDD," 3GPP TSG RAN1#52, R1-080738 (Feb. 11-15, 2008).
NTT Docomo, Inc., "UL Layered Control Signal Structure in LTE-Advanced," 3GPP TSG RAN WG1 Meeting #54bis, R1-083679 (Sep. 29-Oct. 3, 2008).
LG Electronics, "Considerations on DL/UL Transmission in Asymmetric Carrier Aggregation," 3GPP TSG RAN WG1 Meeting #55, R1-084197 (Nov. 10-14, 2008).
LG Electronics, "Uplink control channel transmission for LTE-Advanced," 3GPP TSG RAN WG1, Meeting #56, R1-090656 (Feb. 9-13, 2009).
International Search Report from PCT/KR2009/004262.
International Search Report from PCT/KR2009/001286.
International Search Report from PCT/KR2009/002466.
International Search Report from PCT/KR2009/004264.
NTT DoCoMo, Inc., "Proposal for LTE-Advanced Technologies," 3GPP TSG RAN WG1 Meeting #53bis, R1-082575, Warsaw, Poland, Jun. 30-Jul. 4, 2008, pp. 1-36.
Texas Instruments, "Enhancements for LTE-Advanced," 3GPP TSG RAN WG1 53, R1-081979, Kansas City, MO, May 5-9, 2008.
"Carrier Aggregation in LTE-Advanced," TSG-RAN WG1 #53bis, R1-082468, Jun. 30-Jul. 4, 2008.
USPTO—Office Action for U.S. Appl. No. 12/922,595, filed Sep. 14, 2010—dated May 30, 2013.
Office Action issued in technologically related U.S. Appl. No. 12/922,595 dated Dec. 21, 2012.
Samsung, "Configuration of PDCCH Candidate Sets for the Control of Blind Decoding Attempts," 3GPP TSG RAN WG1 Meeting #52 R1-080675, Sorrento, Italy, Feb. 11-15, 2008.
Motorola, "PDCCH Search Space Assignment and Signaling," 3GPP TSG RAN #52, R1-080731, Sorrento, Italy, Feb. 11-15, 2008.
Office Action issued in Japanese Patent Application No. 2011-521027 dated Dec. 27, 2012.
NTT DoCoMo, "Multiplexing Schemes for UL Control Signals in E-UTRA," 3GPP TSG RAN WG1 Meeting #51, R1-074813, Jeju, Korea, Nov. 5-9, 2007.
Office Action issued in Japanese Patent Application No. 2011-521041 dated Mar. 7, 2013.
"3rd Generation Partnership Project: Technical Specification Group Radio Access Network; Evolved Universal Terrestrial Radio Access (E-UTRA); Multiplexing and channel coding, Release 8," 3GPP TS 36.212 V8.1.0 (Nov. 2007).
"3rd Generation Partnership Project; Technical Specification Group Radio Access (E-UTRA); Physical layer procedures, Release 8," 3GPP TS 36.213 v8.1.0 (Nov. 2007).
Office Action issued in related technology U.S. Appl. No. 13/056,460 dated Mar. 4, 2013.
Office Action dated Jul. 25, 2013 from the Japanese Patent Office in counterpart Japanese application No. 2012-189838.
Samsung, 3GPP TSG RAN WG1 Meeting #51bis, Sevilla Spain, Jan. 14-19, 2008; pp. 1-3.
LG Electronics, 3GPP TSG RAN WG1 Meeting #51, Denver, CO, Feb. 13-17, 2006; pp. 1-4.
Motorola, 3GPP TSG RAN1#50, Athens, Greece, Aug. 20-24, 2007; pp. 1-7.
Office Action dated Aug. 15, 2013 from the Japanese Patent Office in counterpart Japanese application No. 2012-189838.
3GPP TS 36,213 V8.2.0 (Mar. 2008), 3rd Generation Partnership Project; Technical Specification Group Radio Access Network; Evolved Universal Terrestrial Radio Access (E-UTRA) Physical layer procedures (Release 8), pp. 1-30.
3GPP TS 36,321 V8.2.0 (May 2008), 3rd Generation Partnership Project; Technical Specification Group Radio Access Network;

(56) References Cited

OTHER PUBLICATIONS

Evolved Universal Terrestrial Radio Access (E-UTRA) Medium Access Control (MAC) protocol specification (Release 8), pp. 1-33.
3GPP TS 36.213 V8.3.0 (May 2008), "3rd Generation Partnership Project; Technical Specification Group Radio Access Network; Evolved Universal Terrestrial Radio Access (E-UTRA); Physical Layer Procedures (Release 8)," pp. 1-45.
3GPP TS 36.331 V8.2.0 (2008-05), "3rd Generation Partnership Project; Technical Specification Group Radio Access Network; Evolved Universal Terrestrial Radio Access (E-UTRA) Radio Resource Control (RRC); Protocol Specification (Release 8)," pp. 1-40.
"Long Term Evolution Protocol Overview."
LTE Quick Reference, CFI (Control Format Indicator).
Office Action issued by the U.S. Patent & Trademark Office on Sep. 25, 2013, for U.S. Appl. No. 13/056,460.
Uspto—Office Action for U.S. Appl. No. 13/056,451—dated Jun. 10, 2013.
Ericsson, "Carrier Aggregation in LTE-Advanced," 3GPP TSG-RAN WG1 #53bis, R1-082468, Warsaw, Poland, Jun. 30-Jul. 4, 2008.
Samsung, "Configuration of PDCCH Candidate Sets for the Control of Blind Decoding Attempts," 3GPP TSG RAN WG1 Meeting #52, R1-080675, Sorrento, Italy, Feb. 11-15, 2008.
Motorola, "PDCCH Search Space Assignment and Signaling," 3GPP TSG RAN1 #52, R1-080731, Sorrento, Italy, Feb. 11-15, 2008.
Office Action issued in Chinese Patent Application No. CN 2009-80130085.2 dated Nov. 6, 2013.
Office Action dated Jan. 16, 2014, issued by the U.S. Patent & Trademark Office for U.S. Appl. No. 13/056,460.
Office Action dated Feb. 27, 2014, issued by the Japanese Patent Office for Japanese Patent Application No. 2011-521027.
R1-092330, 3GPP TSG-RAN WG1 #57bis, "Component carrier indication for bandwidth extension in LTE-A," Alcatel-Lucent, Jun. 29-Jul. 3, 2009, pp. 1-5.
3GPP TS 36.213 v8.3.0 (May 2008); 3rd Generation Partnership Project; Technical Specification Group Radio Access Network; Evolved Universal Terrestrial Radio Access (E-UTRA); Physical layer procedures (Release 8).
Office Action dated Jun. 4, 2014, issued by the U.S. Patent and Trademark Office in U.S. Appl. No. 13/056,451.
Office Action dated Feb. 21, 2014, issued by the Japanese Patent Office for Japanese Patent Application No. 2012-189838.
Office Action dated Feb. 24, 2014, issued by the U.S. Patent & Trademark Office for U.S. Appl. No. 13/056,451.
"3rd Generation Partnership Project; Technical Specification Group Radio Access Network; Feasibility study for evolved Universal Terrestrial Radio Access (UTRA) and Universal Terrestrial Radio Access Network (UTRAN) (Release 7)," 3GPP Standard; 3GPP TR 25.912, V7.2.0, XP050369335, Jun. 2007.
"3rd Generation Partnership Project; Technical Specification Group Radio Access network; Evolved Universal Terrestrial Radio Access (E-UTRA); Physical layer procedures (Release 8)," 3GPP Standard; 3GPP TS 36.213, V8.2.0, XP050377557, Mar. 2008.
Motorola: "PHICH Assignment for TDD and FDD E-UTRA," 3GPP TSG RAN1 #52, R1-080734—PHICH Assignment FDD-TDD, 3rd Generation Partnership Project (3GPP), vol. RAN WG1, XP050109224, Feb. 2008.
Ericsson: "LTE Resource aggregation," 3GPP TSG-RAN WG4 (rADIO) Meeting #38, R4-060066, 3rd Generation Partnership Project (3GPP), Mobile Competence Centre; vol. RAN WG4, XP050175140, Feb. 2006.
LG Electronics: "Proposals and issues on the carrier aggregation and control signaling for LTE-A," 3GPP TSG RAN WG1 #55, R1-084194 LTE A_Carrier Aggregation, XP050317483, Nov. 2008.
LG Electronics: "PDCCH structure for multiple component carriers," 3GPP TSG RAN WG1 #56, R1-091065 LTE0A PDCCH Structure, XP050318878, Feb. 2009.
Texas Instruments: "Issues on Carrier Aggregation for Advanced E-UTRA," 3GPP TSG RAN WG1 #55, R1-084443, XP050317701, Nov. 2008.
Nokia et al.: "L1 control signaling with carrier aggregation in LTE-Advanced," 3GPP TSG-RAN WG1 Meeting #54bis, R1-083730, XP050317069, Sep. 2008.
Ericsson: "Carrier aggregation in LTE-Advanced," 3GPP TSG-RAN WG1 #53bis, R1-082468, 3rd Generation Partnership Project (3GPP), Mobile Competence Centre; vol. RAN WG4, XP050110739, Jun. 2008.
European Search Report dated Jun. 23, 2014, issued by the European Patent Office in European Patent Application No. 09719705.7.
European Search Report dated Jun. 23, 2014, issued by the European Patent Office in European Patent Application No. 09803164.4.
Ericsson: "Blind PDCCH decoding," 3GPP TSG-RAN Meeting #53, R1-082229, 3rd Generation Partnership Project (3GPP), XP050110524, May 2008.
Qualcomm Europe: "Details on PDCCH for DL data arrival," 3GPP TSG-RAN WG1 #53, R1-081978 PDCCH for DL Data Arrival, 3rd Generation Partnership Project (3GPP), XP050110327, May 2008.
LG Electronics: "Component carrier indication by PDCCH for multiple carrier aggregation in LTE-Advanced," 3GPP TSG-RAN WG1 #57 bis, R1-092500 CC Indication in PDCCH, 3rd Generation Partnership Project (3GPP), XP050351007, Jun. 2009.
ITRI: "Carrier Identification in PDCCH," 3GPP TSG RAN WG1 Meeting #57 bis, R1-092683_Carrier_Indication_in_PDCCH, 3rd Generation Partnership Proejct (3GPP), XP050351161, Jun. 2009.
Ericsson: "Carrier aggregation in LTE-Advanced," 3GPP TSG-RAN WG1 Meeting #53bis, R1-082468, 3rd Generation Partnership Project (3GPP), XP050110739, Jun. 2008.
European Search Report dated Jul. 18, 2014, issued by the European Patent Office in European Patent Application No. 09803166.9.
LG Electronics: "Randomization Function for PDCCH search space," 3GPP TSG RAN WG1#52bis, R1-081567, PDCCH Sesarch Space Randomization (Revised), XP050109982, 2008.
Motorola: "Search Space Definition: Reduced PDCCH Blind Detection for Split PDCCH Search Space," 3GPP TSG RAN1#51, R1-074583, XP050108074, 2007.
Samsung: "UE-specific search space," 3GPP TSG RAN WG1 Meeting #52bis, R1-081212, XP050109656, 2008.
LG Electronics: "PDCCH structure for multiple carrier aggregation in LTE-Advanced," 3GPP TSG RAN WG1 #57, R1-092237, XP050339657, May 2009.
Nortel Networks: "Control Channel Design for the Support of Wider Bandwidth for LTE-Advanced," 3GPP TSG-RAN1 #55bis, R1-090157, XP050597201, Jan. 2009.
Office Action dated Aug. 29, 2014, issued by the U.S. Patent and Trademark Office in U.S. Appl. No. 12/922,595.
Certificate dated Aug. 13, 2014, issued by the State Intellectual Property Office of China in Chinese Patent Application No. 200980130083.3.
Office Action dated Nov. 15, 2014, issued by the State Intellectual Property Office of China in Chinese Patent Application No. 200980130086.7.
Office Action issued in U.S. Appl. No. 12/922,595 dated Mar. 26, 2015.
Office Action issued in U.S. Appl. No. 13/056,451 dated Jan. 26, 2015.
Office Action issued in U.S. Appl. No. 13/056,451 dated Sep. 18, 2014.
Extended European Search Report issued in corresponding EP Patent Application No. 09803168.5 dated May 28, 2015.
Motorola, "E-UTRA Uplink Control Channel Design and TP," 3GPP TSG RAN1 #44, R1-060403, Denver, USA, Feb. 13-17, 2007.
Notice of Allowance issued in corresponding Japanese Patent Application No. 2014-258368 dated Dec. 15, 2015.
Qualcomm Europe, "Carrier Aggregation Operation in LTE-Advanced," 3GPP TSG RAN WG1 #54, R1-083193, Jeju, South Korea, Aug. 18-22, 2008.

* cited by examiner

[Fig. 1]
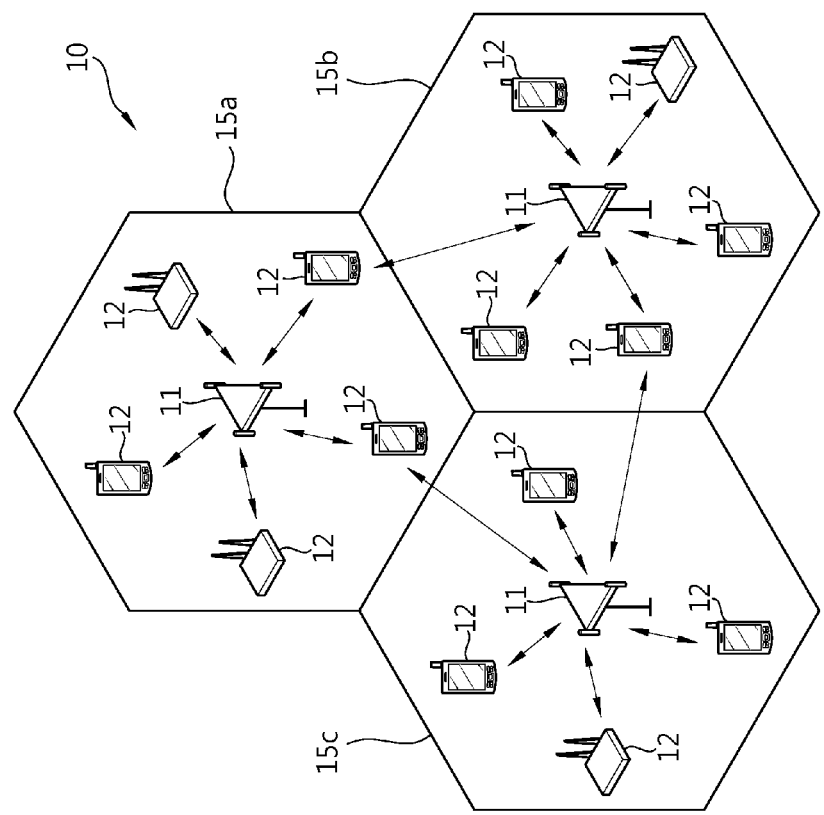
[Fig. 2]
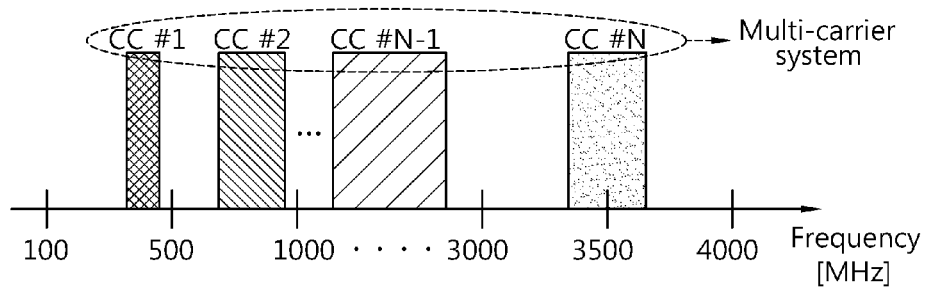

[Fig. 3]
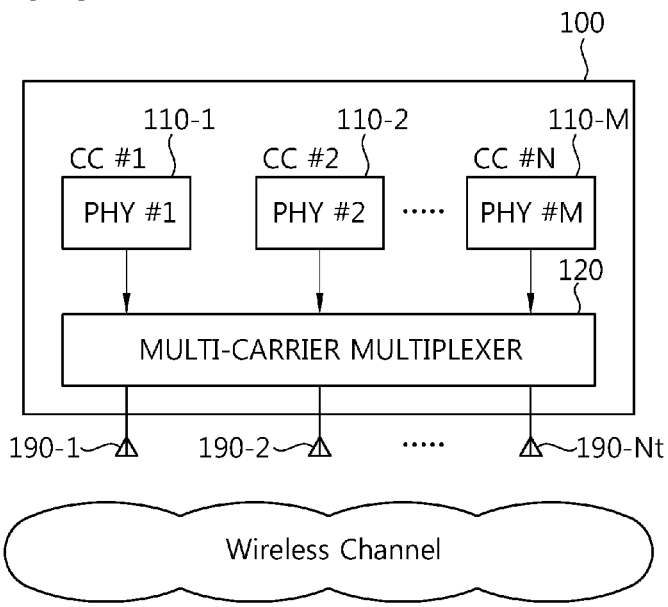
[Fig. 4]
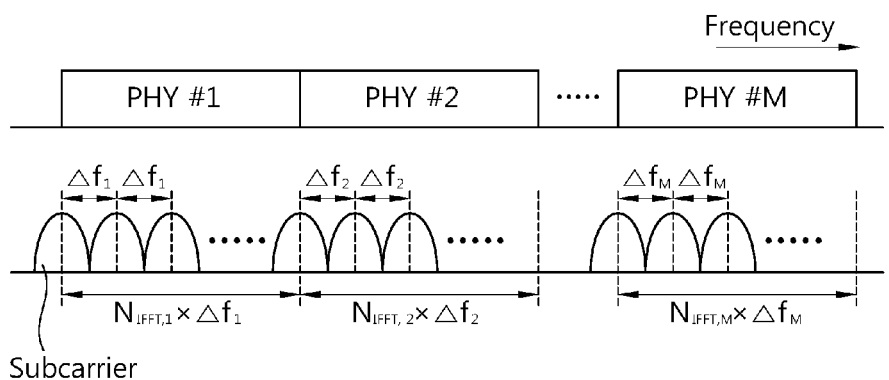

[Fig. 5]
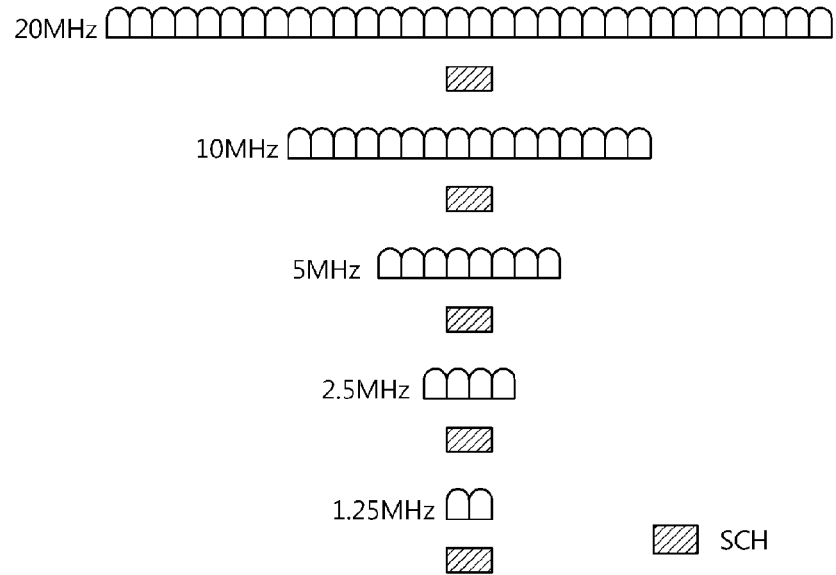
[Fig. 6]
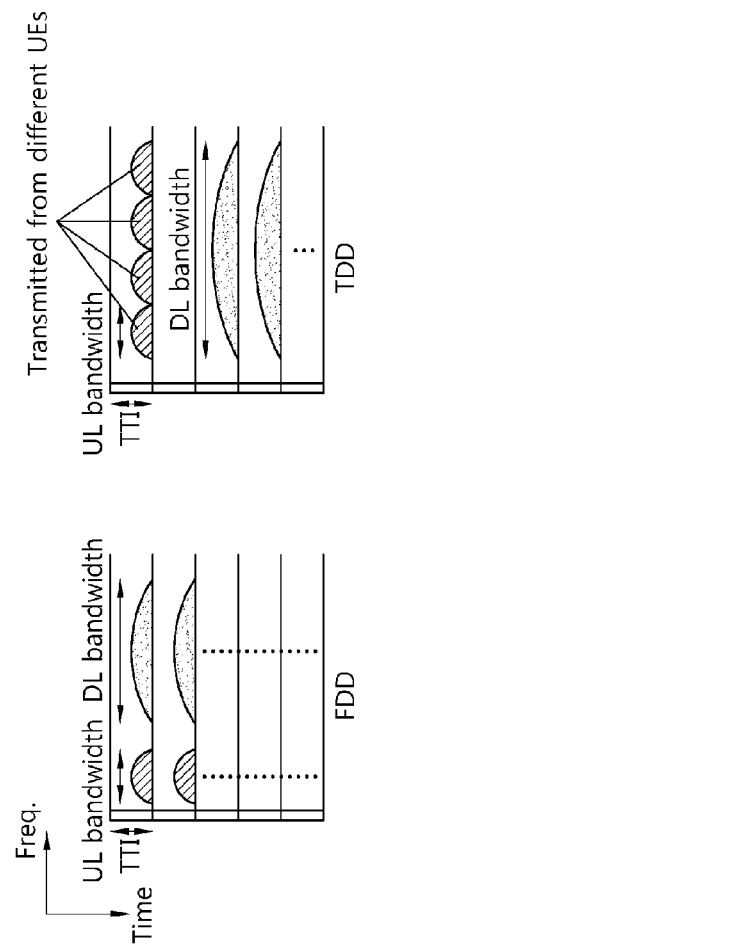

[Fig. 7]
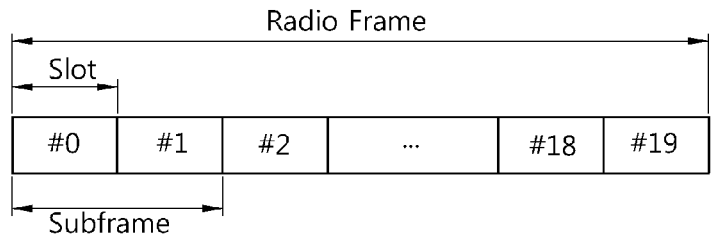
[Fig. 8]
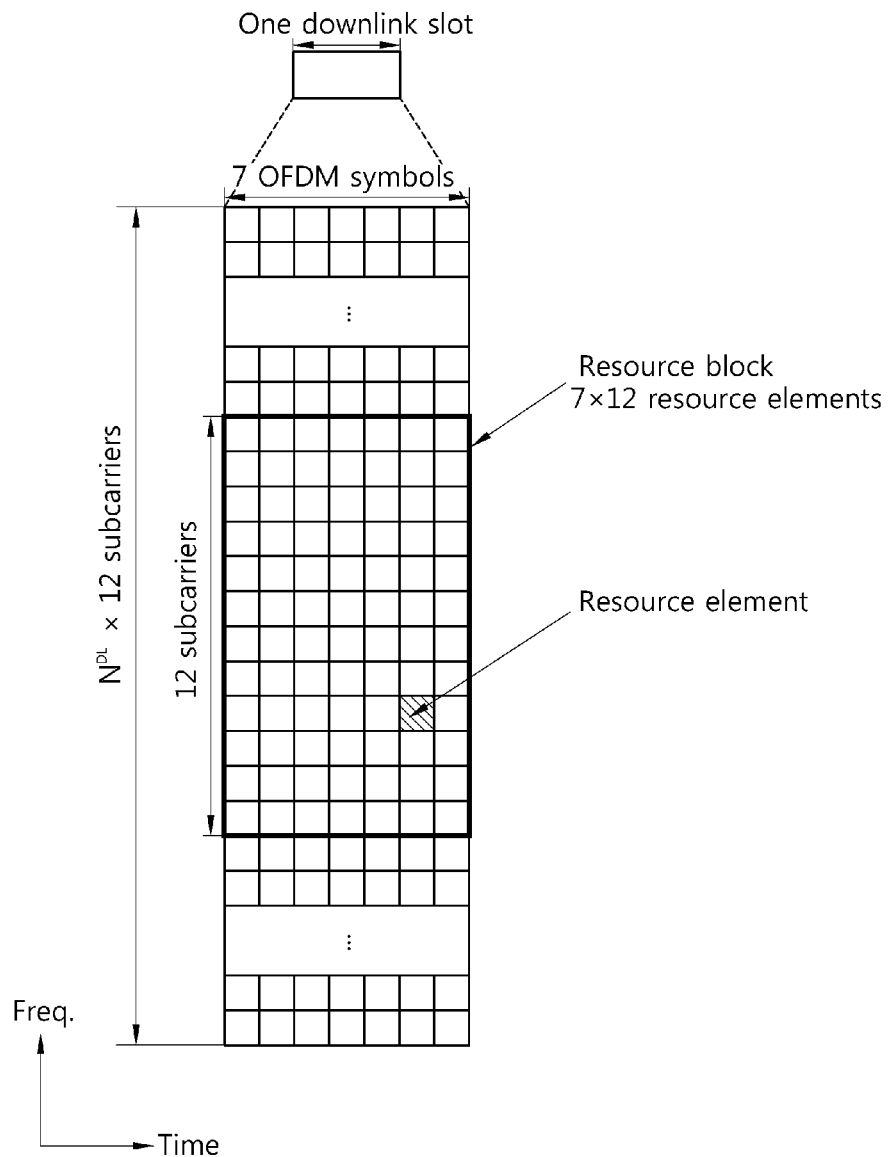

[Fig. 9]
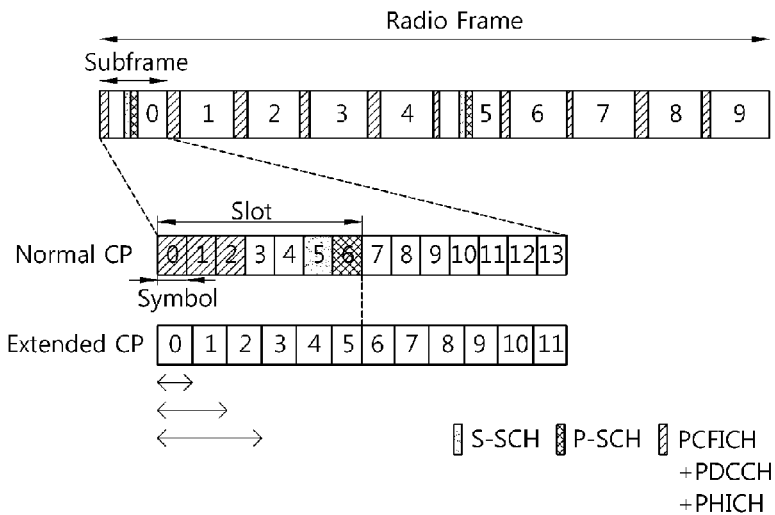
[Fig. 10]
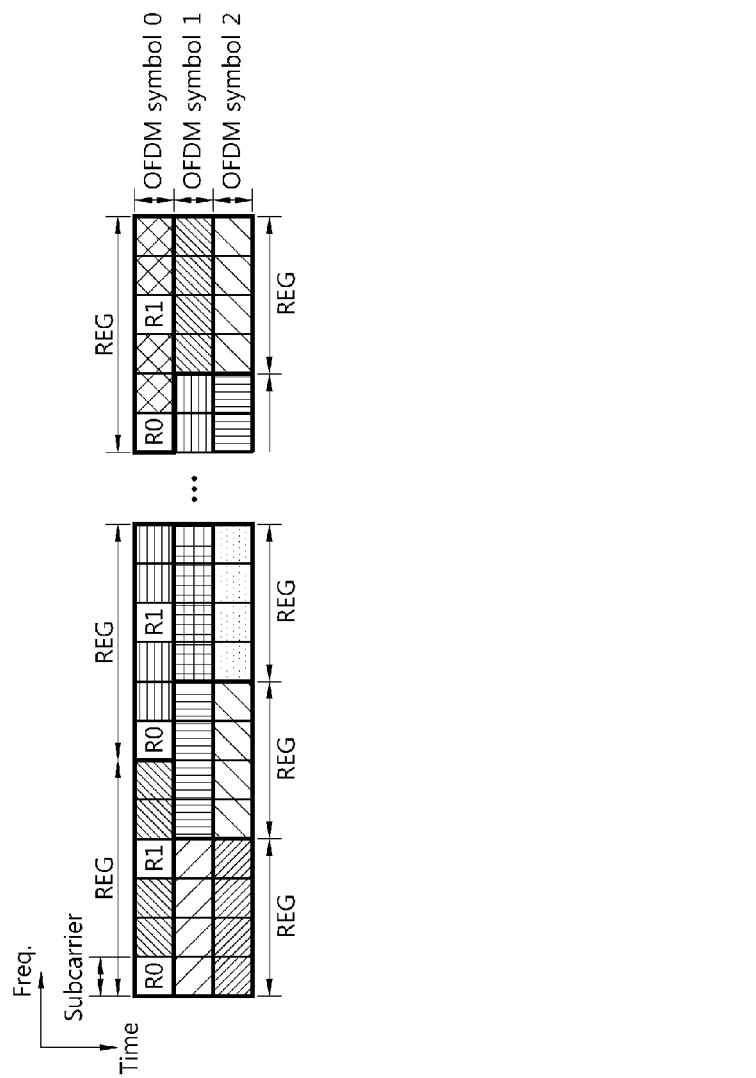

[Fig. 11]
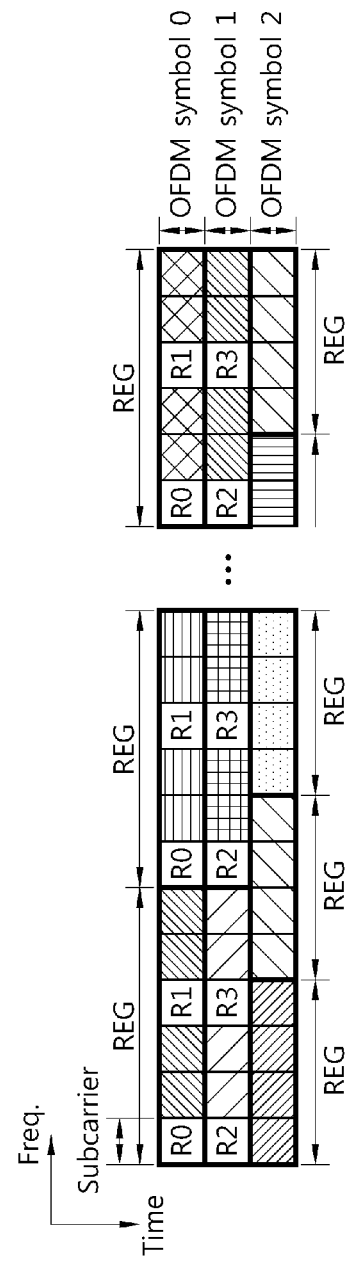

[Fig. 12]
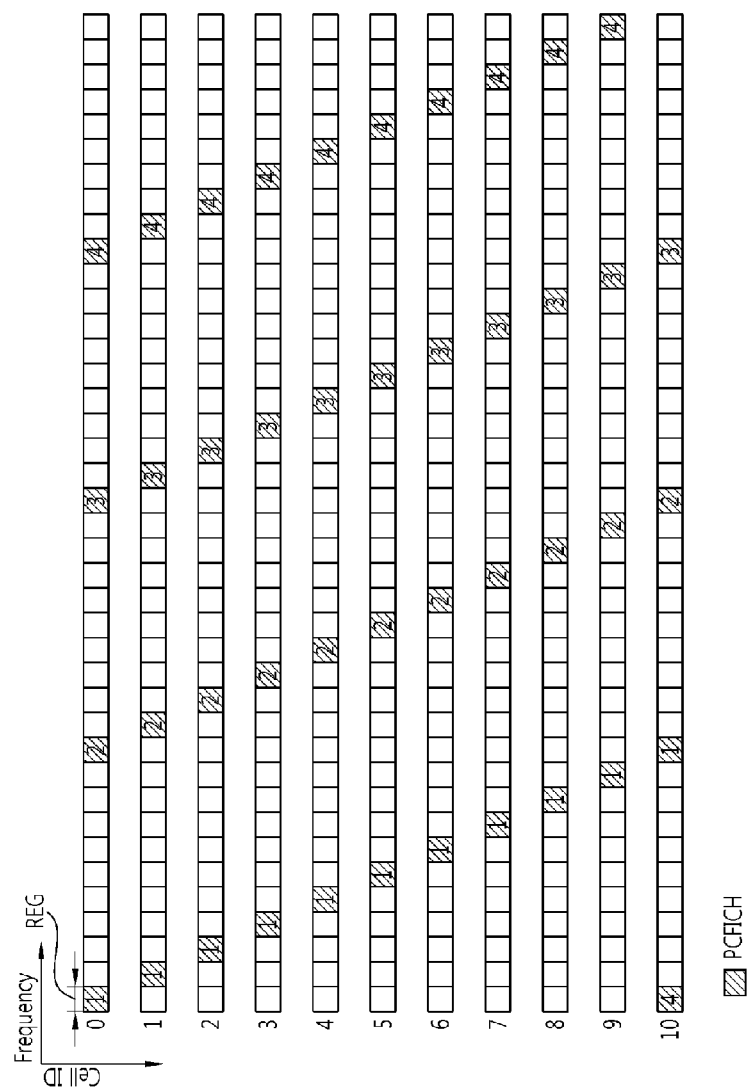
[Fig. 13]
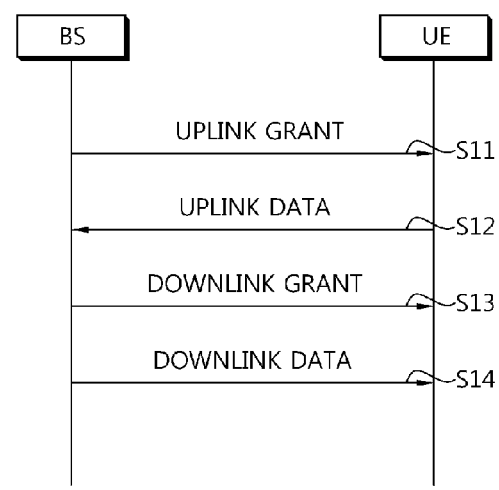

[Fig. 14]
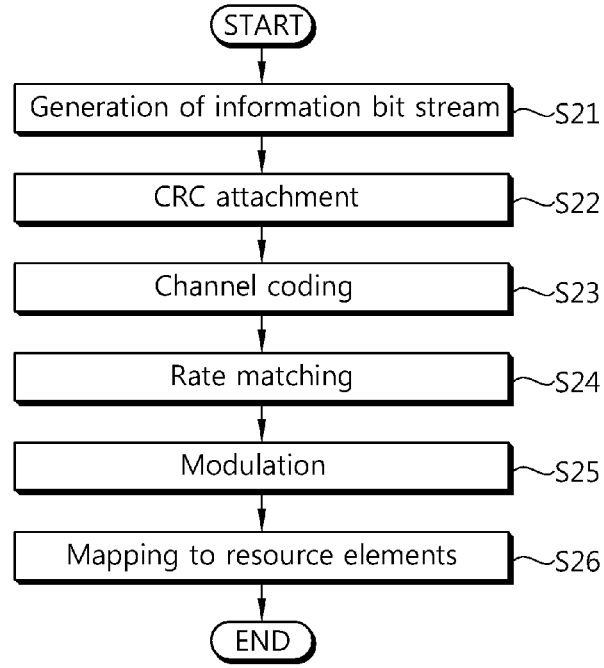
[Fig. 15]
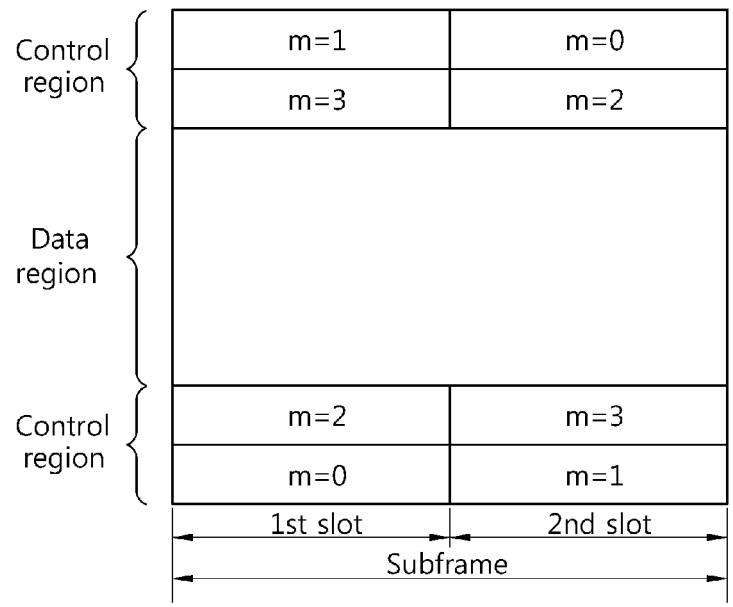
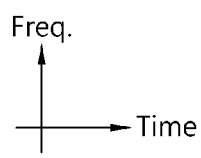

[Fig. 16]
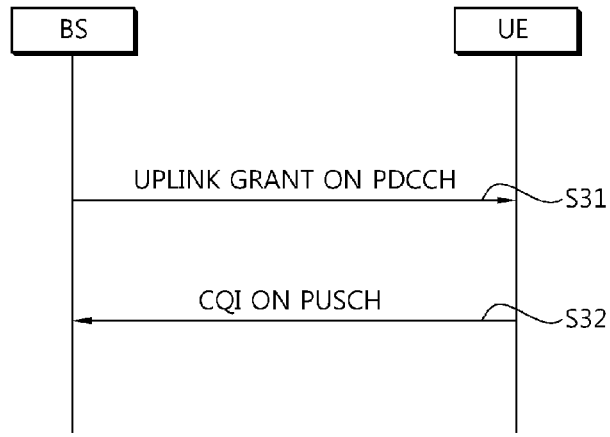
[Fig. 17]
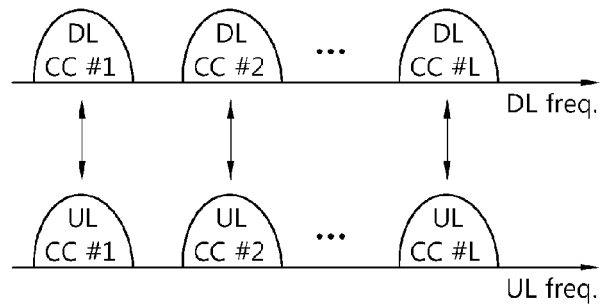
[Fig. 18]
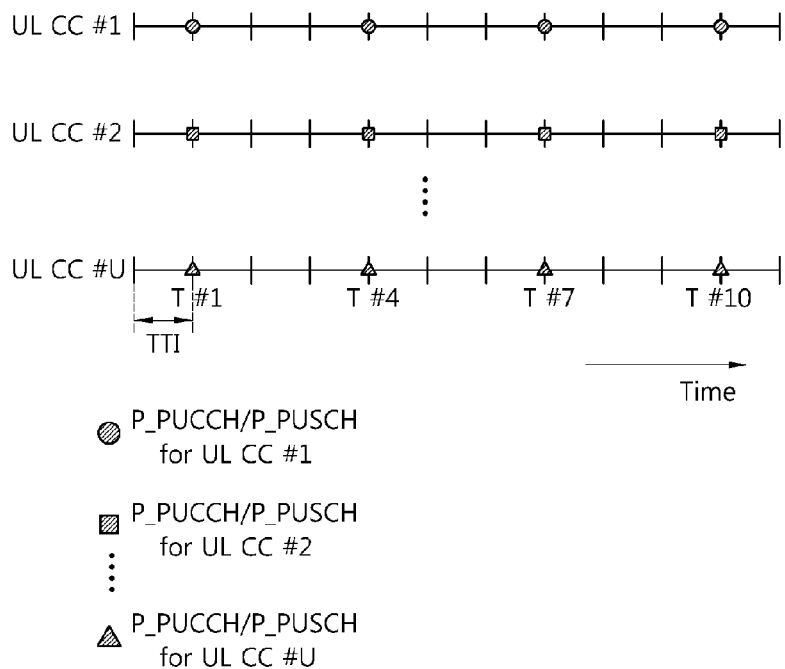

[Fig. 19]
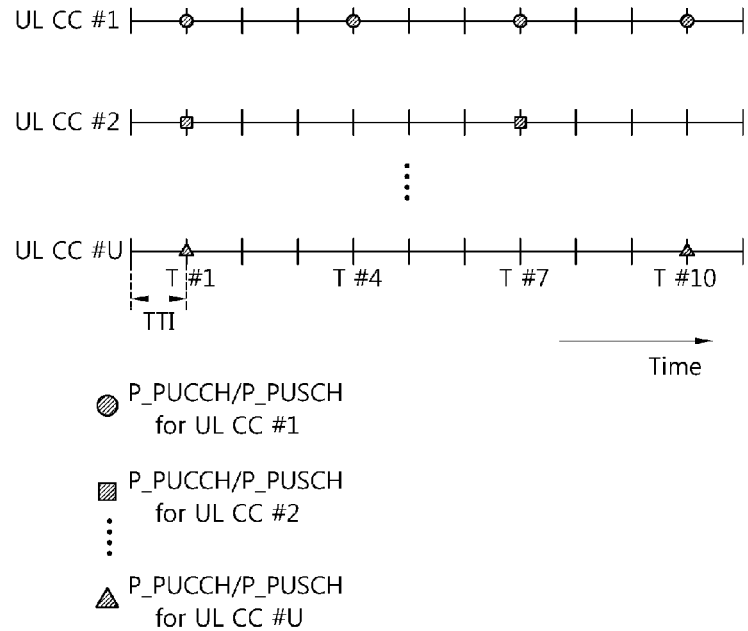
[Fig. 20]
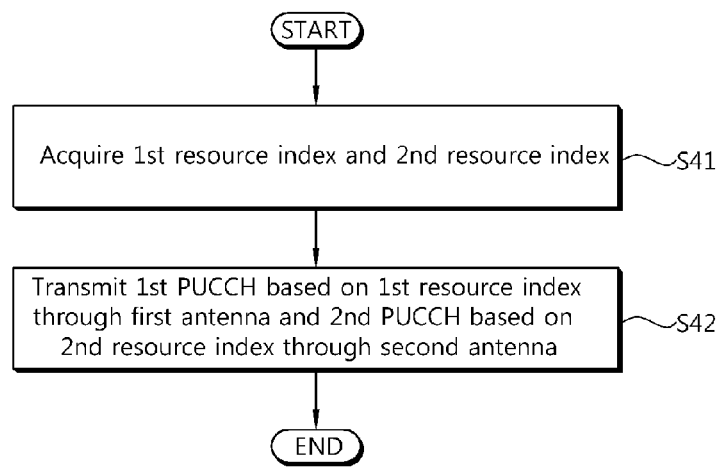
[Fig. 21]
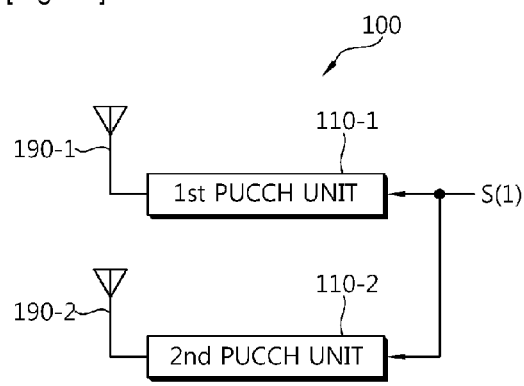

[Fig. 22]
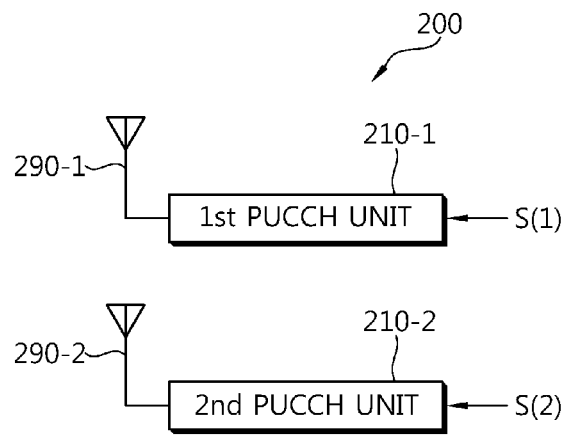
[Fig. 23]
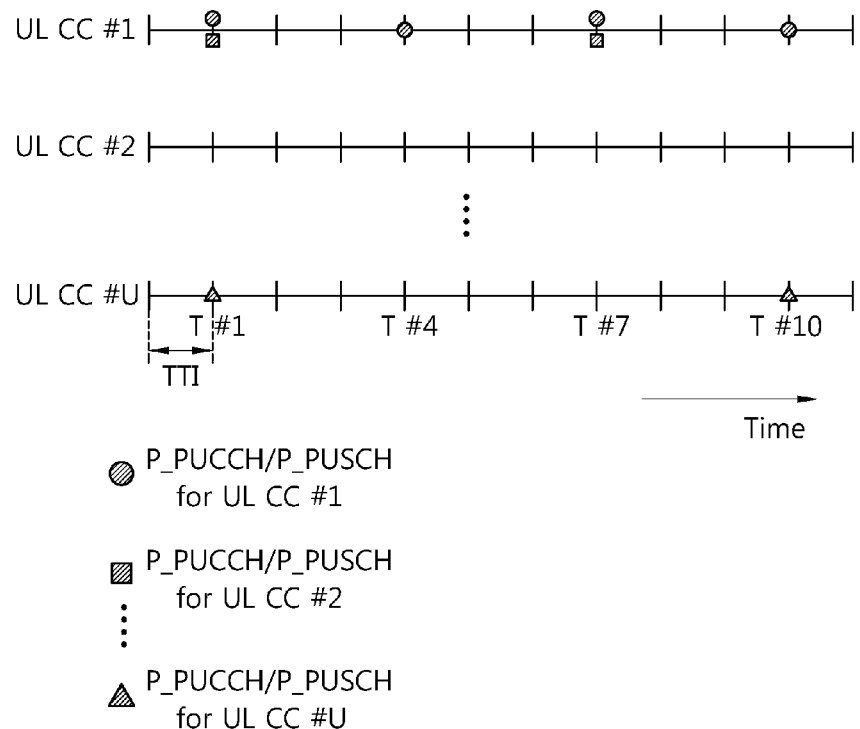

[Fig. 24]
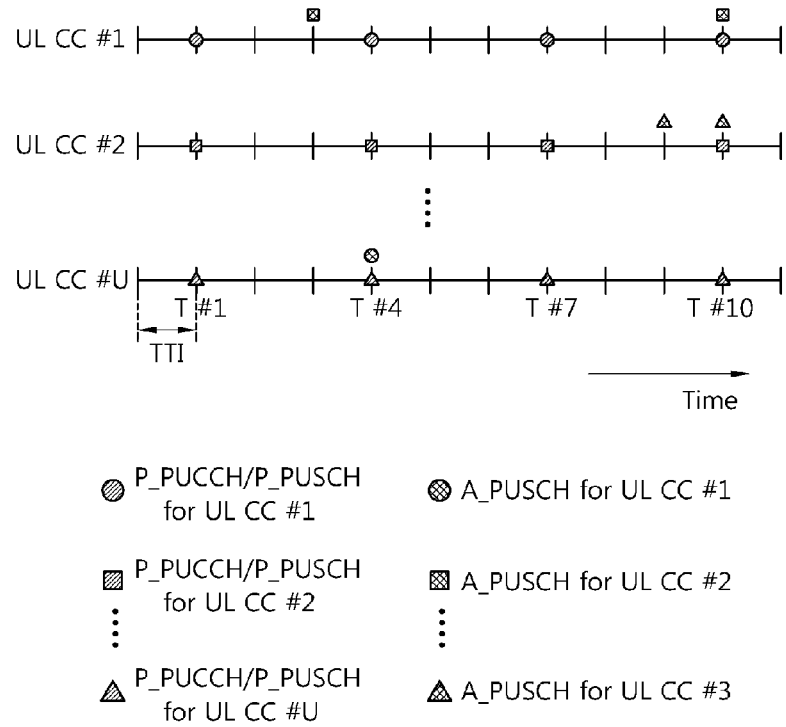
[Fig. 25]
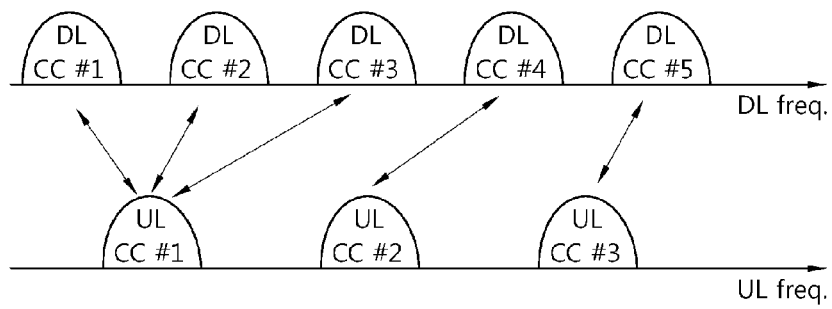
[Fig. 26]
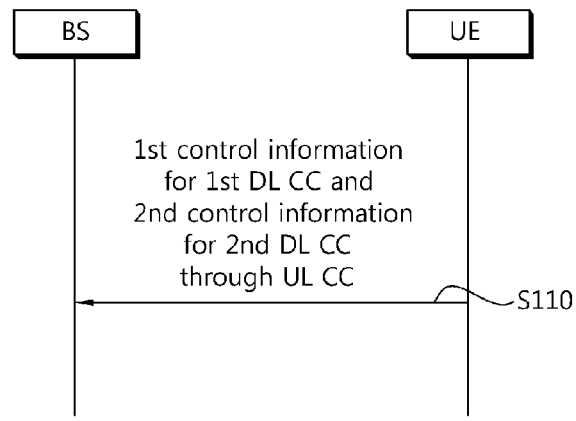

[Fig. 27]
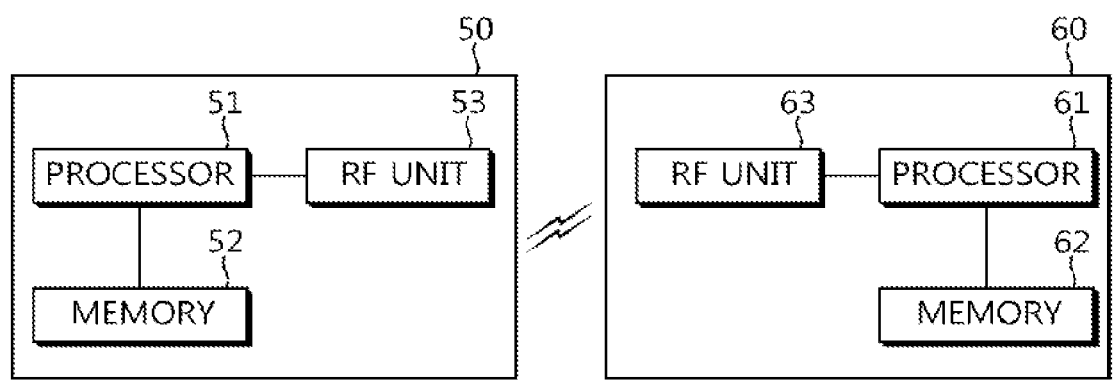

METHOD AND APPARATUS OF TRANSMITTING CONTROL INFORMATION IN WIRELESS COMMUNICATION SYSTEM

The present application is a national stage of PCT International Application No. PCT/KR2009/004266, filed Jul. 30, 2009, and claims the benefit of U.S. Provisional Application Nos. 61/084,992 and 61/226,756, filed Jul. 30, 2008, and Jul. 20, 2009. The present national stage application also claims the benefit of Korean Patent Application No. 10-2008-0099671, filed Oct. 10, 2008.

TECHNICAL FIELD

The present invention relates to wireless communications, and more particularly, to a method and an apparatus of transmitting control information in a wireless communication system.

BACKGROUND ART

Wireless communication systems are widely spread all over the world to provide various types of communication services such as voice or data. The wireless communication system is designed for the purpose of providing reliable communication to a plurality of users irrespective of their locations and mobility. However, a wireless channel has an abnormal characteristic such as path loss, noise, fading due to multipath, an inter-symbol interference (ISI), the Doppler effect due to mobility of a user equipment, etc. Therefore, various techniques have been developed to overcome the abnormal characteristic of the wireless channel and to increase reliability of wireless communication.

Multiple Input Multiple Output (MIMO) is a technique for supporting reliable high-speed data services. The MIMO technique improves data transmission/reception efficiency by using multiple transmit (Tx) antennas and multiple receive (Rx) antennas. Examples of the MIMO technique include spatial multiplexing, transmit diversity, beamforming, etc. A MIMO channel matrix depending on the number of Rx antennas and the number of Tx antennas can be decomposed into a plurality of independent channels. Each independent channel is referred to as a layer or a stream. The number of layers is referred to as a rank.

In general, the wireless communication system is a multiple access system capable of supporting communication with multiple users by sharing available radio resources. Examples of the radio resource include a time, a frequency, a code, transmit power, etc. Examples of the multiple access system include a time division multiple access (TDMA) system, a code division multiple access (CDMA) system, a frequency division multiple access (FDMA) system, an orthogonal frequency division multiple access (OFDMA) system, a single carrier frequency division multiple access (SC-FDMA) system, etc. The radio resource is a time in the TDMA system, a code in the CDMA system, and a subcarrier and a time in the OFDMA system.

While having almost the same complexity with the OFDMA, SC-FDMA has a lower peak-to-average power ratio (PAPR) due to a single carrier property. Since the low PAPR is advantageous for a user equipment (UE) in terms of transmission power efficiency, the SC-FDMA is adopted for uplink transmission in a 3rd generation partnership project (3GPP) long term evolution (LTE) as disclosed in section 5 of the 3GPP TS 36.211 V8.2.0 (2008-03) "Technical Specification Group Radio Access Network; Evolved Universal Terrestrial Radio Access (E-UTRA); Physical channels and modulation (Release 8)".

Various uplink control information are transmitted on an uplink control channel. Examples of the uplink control information include a hybrid automatic repeat request (HARQ) acknowledgement (ACK)/not-acknowledgement (NACK), a channel quality indicator (CQI) indicating downlink channel quality, a scheduling request (SR) requesting resource allocation for uplink transmission, etc.

Meanwhile, as a mobile communication system of a next generation (i.e., post-3rd generation), an international mobile telecommunication-advanced (IMT-A) system is standardized aiming at support of an Internet protocol (IP)-based seamless multimedia service in an international telecommunication union (ITU) by providing a high-speed transmission rate of 1 gigabits per second (Gbps) in downlink communication and 500 megabits per second (Mbps) in uplink communication. In a 3rd generation partnership project (3GPP), a 3GPP long term evolution-advanced (LTE-A) system is considered as a candidate technique for the IMT-A system. The LTE-A system is evolved to increase a completion level of the LTE system, and is expected to maintain backward compatibility with the LTE system. This is because the provisioning of compatibility between the LTE-A system and the LTE system is advantageous in terms of user convenience, and is also advantageous for a service provider since existing equipment can be reused.

In general, a wireless communication system is a single carrier system supporting a single carrier. The transmission rate is proportional to transmission bandwidth. Therefore, for supporting a high-speed transmission rate, transmission bandwidth shall be increased. However, except for some areas of the world, it is difficult to allocate frequencies of wide bandwidths. For effectively using fragmented small frequency bands, a spectrum aggregation (also referred to as bandwidth aggregation or carrier aggregation) technique is being developed. The spectrum aggregation technique is to obtain the same effect as if which a frequency band of a logically wide bandwidth may be used by aggregating a plurality of physically discontiguous frequency bands in a frequency domain. Through the spectrum aggregation technique, multiple carrier (multi-carrier) can be supported in the wireless communication system. The wireless communication system supporting multi-carrier is referred to as a multi-carrier system. The carrier may be also referred to as a radio frequency (RF), component carrier (CC), etc.

Accordingly, there is a need for a method and an apparatus of effectively transmitting control information in a multi-carrier system.

DISCLOSURE OF INVENTION

Technical Problem

The present invention provides a method and an apparatus of transmitting control information in a wireless communication system.

Technical Solution

In an aspect, a method of transmitting control information in a wireless communication system, carried in a user equipment (UE), is provided. The method includes transmitting first control information and second control information to a base station (BS) through an uplink component carrier (UL CC), wherein the first control information is for a first downlink component carrier (DL CC), and the second control information is for a second DL CC.

Preferably, the first control information is transmitted with a periodicity of a first cycle, the second control information is transmitted with a periodicity of a second cycle, and the second cycle is a multiple of the first cycle.

Preferably, the first control information is transmitted on a first physical uplink control channel (PUCCH), and the second control information is transmitted on a second PUCCH.

Preferably, the first PUCCH is transmitted based on a first resource index through a first antenna, and the second PUCCH is transmitted based on a second resource index through a second antenna, and a resource index identifies a resource used for transmission of a PUCCH.

The method may further include transmitting third control information on a third PUCCH and a fourth PUCCH through the UL CC, wherein the third control information is for the first DL CC, the third PUCCH is transmitted based on the first resource index through the first antenna, and the fourth PUCCH is transmitted based on the second resource index through the second antenna.

Preferably, the first control information comprises a first channel quality indicator (CQI) for the first DL CC, and the second control information comprises a second CQI for the second DL CC.

In another aspect, a UE is provided. The UE includes a radio frequency (RF) unit transmitting and/or receiving a radio signal, and a processor coupled with the RF unit and configured to transmit first control information and second control information through a UL CC, wherein the first control information is for a DL CC, and the second control information is for a second DL CC.

In still another aspect, a method of transmitting control information in a wireless communication system, carried in a UE, is provided. The method includes transmitting first control information to a BS in a first subframe through a UL CC, and transmitting second control information to the BS in a second subframe through the UL CC.

Preferably, the first control information is transmitted on a first PUCCH, and the second control information is transmitted on a second PUCCH.

Preferably, the first control information is a first hybrid automatic repeat request (HARQ) acknowledgement (ACK)/not-acknowledgement (NACK) for a first DL CC, and the second control information is a second HARQ ACK/NACK for a second DL CC.

Preferably, the first control information is an HARQ ACK/NACK for a plurality of DL CCs, and the second information comprises indicator indicating at least one DL CCs out of the plurality of the DL CCs for the HARQ ACK/NACK.

Advantageous Effects

A method and an apparatus of effectively transmitting control information are provided. Accordingly, overall system performance can be improved.

BRIEF DESCRIPTION OF DRAWINGS

FIG. 1 is a block diagram showing a wireless communication system.
FIG. 2 shows an example of a plurality of component carriers (CCs) used in a multi-carrier system.
FIG. 3 is a block diagram showing an example of a multi-carrier system.
FIG. 4 shows an example of a plurality of physical channels (PHYs).
FIG. 5 shows an example of a bandwidth used by a PHY.
FIG. 6 shows an example of an asymmetric structure of downlink and uplink in a multi-carrier system.
FIG. 7 shows a structure of a radio frame.
FIG. 8 shows an example of a resource grid for one downlink slot.
FIG. 9 shows a structure of a radio frame and a subframe in a frequency division duplex (FDD) system.
FIG. 10 shows an example of an resource element group (REG) structure when a base station (BS) uses one or two transmit (Tx) antennas.
FIG. 11 shows an example of an REG structure when a BS uses four Tx antennas.
FIG. 12 shows an example of mapping of a physical control format indicator channel (PCFICH) to REGs.
FIG. 13 is a flow diagram showing an example of a method of transmitting data and receiving data performed by a user equipment (UE).
FIG. 14 is a flowchart showing an example of a method of configuring a physical downlink control channel (PDCCH).
FIG. 15 shows an exemplary structure of a UL subframe.
FIG. 16 is a flow diagram showing an example of a method of aperiodically transmitting a CQI.
FIG. 17 shows an example of a linking method between DL CCs and UL CCs in a multi-carrier system having the symmetric structure.
FIG. 18 shows an example in which the transmit cycles of a P_PUCCH/a P_PUSCH on a UL CC basis are synchronized with each other.
FIG. 19 shows another example in which transmit cycles of a P_PUCCH/a P_PUSCH on a UL CC basis are synchronized with each other.
FIG. 20 is a flowchart illustrating a method of a UE transmitting PUCCHs in a multi-antenna system.
FIG. 21 is a block diagram showing an example of a transmitter structure in which the ORTD method is implemented.
FIG. 22 is a block diagram showing an example of a transmitter structure in which the ORSM method is implemented.
FIG. 23 shows an example in which the transmit cycles of a P_PUCCH/a P_PUSH on a UL CC basis are synchronized with each other and accordingly a multi-PUCCH is transmitted.
FIG. 24 shows an example in which an A_PUSCH and P_PUSCH/P_PUCCH are transmitted in a multi-carrier system.
FIG. 25 shows an example of a linking method between DL CCs and UL CCs in a multi-carrier system having the asymmetric structure.
FIG. 26 is a flowchart showing method of transmitting control information, performed by a UE, according to an embodiment of the present invention.
FIG. 27 is a block diagram showing wireless communication system to implement an embodiment of the present invention.

MODE FOR THE INVENTION

FIG. 1 is a block diagram showing a wireless communication system.

Referring to FIG. 1, a wireless communication system 10 includes at least one base station (BS) 11. The BSs 11 provide communication services to specific geographical regions (generally referred to as cells) 15a, 15b, and 15c. The cell can be divided into a plurality of regions (referred to as sectors). A user equipment (UE) 12 may be fixed or mobile, and may be referred to as another terminology, such as a mobile station (MS), a user terminal (UT), a subscriber station (SS), a wireless device, a personal digital assistant (PDA), a wireless modem, a handheld device, etc. The BS 11 is generally a fixed station that communicates with the UE 12 and may be referred to as another terminology, such as an evolved node-B (eNB), a base transceiver system (BTS), an access point, etc.

Hereinafter, a downlink (DL) denotes communication from the BS to the UE, and an uplink (UL) denotes communication from the UE to the BS. In the DL, a transmitter may be a part of the BS, and a receiver may be a part of the UE. In the UL, the transmitter may be a part of the UE, and the receiver may be a part of the BS.

The wireless communication system supports multi-antenna. The transmitter may use a plurality of transmit (Tx) antennas, and the receiver may use a plurality of receive (Rx) antennas. The Tx antenna is a logical or physical antenna used to transmit one signal or one stream, and the Rx antenna is a logical or physical antenna used to receive one signal or one stream.

If the transmitter and the receiver use multi-antenna, the wireless communication system may be called as multiple input multiple output (MIMO) system.

FIG. 2 shows an example of a plurality of component carriers (CCs) used in a multi-carrier system.

Referring to FIG. 2, a multi-carrier system may use N CCs (CC #1, CC #2, ..., CC #N). Although it is described herein that adjacent CCs are physically discontiguous in a frequency domain, this is for exemplary purposes only. Adjacent CCs may be physically contiguous in a frequency domain Therefore, a frequency band of a logically wide bandwidth may be used in the multi-carrier system by aggregating a plurality of physically discontiguous and/or contiguous CCs in a frequency domain.

In downlink, a BS concurrently can transmit information to one UE through one or more CCs. In uplink, the UE can also transmit data to the BS through one or more CCs.

FIG. 3 is a block diagram showing an example of a multi-carrier system.

Referring to FIG. 3, each of a transmitter 100 and a receiver 200 uses N CCs (CC #1, CC #2, ..., CC #N) in a multi-carrier system. A CC includes one or more physical channels (hereinafter, simply referred to as PHYs). A wireless channel is established between the transmitter 100 and the receiver 200.

The transmitter 100 includes a plurality of PHYs 110-1, ..., 110-M, a multi-carrier multiplexer 120, and a plurality of Tx antennas 190-1, ..., 190-Nt. The receiver 200 includes a multi-carrier demultiplexer 210, a plurality of PHYs 220-1, ..., 220-L, and a plurality of Rx antennas 290-1, ..., 290-Nr. The number M of PHYs of the transmitter 100 may be identical to or different from the number L of PHYs of the receiver 200. Although it is described herein that each of the transmitter 100 and the receiver 200 includes a plurality of antennas, this is for exemplary purposes only. The transmitter 100 and/or the receiver 200 includes a single antenna.

The transmitter 100 generates Tx signals from information based on the N CCs, and the Tx signals are transmitted on M PHYs 110-1, ..., 110-M. The multi-carrier multiplexer 120 combines the Tx signals so that the Tx signals can be simultaneously transmitted on the M PHYs. The combined Tx signals are transmitted through the Nt Tx antennas 190-1, ..., 190-Nt. The Tx radio signals are received through the Nr Rx antennas 290-1, ..., 290-Nr of the receiver 200 through the wireless channel. The Rx signals are de-multiplexed by the multi-carrier demultiplexer 210 so that the Rx signals are separated into the L PHYs 220-1, ..., 220-L. Each of the PHYs 220-1, ..., 220-L recovers the information.

The multi-carrier system may include one or more carrier modules. The carrier module upconverts a baseband signal to a carrier frequency to be modulated onto a radio signal, or downconverts a radio signal to recover a baseband signal. The carrier frequency is also referred to as a center frequency. The multi-carrier system may use a plurality of carrier modules for each carrier frequency, or use a carrier module which can change a carrier frequency.

FIG. 4 shows an example of a plurality of PHYs. FIG. 4 shows an example of N CCs consisting of M PHYs (PHY #1, PHY #2, ..., PHY #M).

Referring to FIG. 4, each of M PHYs has a specific bandwidth (BW). An PHY #m has a center frequency $f_{c,m}$ and a bandwidth of $N_{IFFT,m} \times \Delta f_m$ (where m=1, ..., M). Herein, $N_{IFFT,m}$ denotes an inverse fast Fourier transform (IFFT) size of the PHY #m, and $\Delta f_m$ denotes a subcarrier spacing of the PHY #m. The IFFT size and the subcarrier spacing may be different or identical for each PHY. Center frequencies of the respective PHYs may be arranged with a regular interval or an irregular interval.

According to a UE or a cell, each PHY may use a bandwidth narrower than a maximum bandwidth. For example, if it is assumed that each PHY has a maximum bandwidth of 20 mega Hertz (MHz), and M is 5, then a full bandwidth of up to 100 MHz can be supported.

FIG. 5 shows an example of a bandwidth used by a PHY.

Referring to FIG. 5, if it is assumed that a maximum bandwidth of the PHY is 20 MHz, the PHY can use a bandwidth (e.g., 10 MHz, 5 MHz, 2.5 MHz, or 1.25 MHz) narrower than the maximum bandwidth. Regardless of a bandwidth size used by the PHY in downlink, a synchronization channel (SCH) may exist in each PHY. The SCH is a channel for cell search. The cell search is a procedure by which a UE acquires time synchronization and frequency synchronization with a cell and detects a cell identifier (ID) of the cell. If the SCH is located in all downlink PHYs, all UEs can be synchronized with the cell. In addition, if a plurality of downlink PHYs are allocated to the UE, cell search may be performed for each PHY or may be performed only for a specific PHY.

As such, a UE or a BS can transmit and/or receive information based on one or more PHYs in the multi-carrier system. The number of PHYs used by the UE may be different from or equal to the number of PHYs used by the BS. In general, the BS can use M PHYs, and the UE can use L PHYs (M≥L, where M and L are natural numbers). Herein, L may differ depending on a type of the UE.

The multi carrier system can have several types of uplink and downlink configurations. In a frequency division duplex (FDD) system or a time division duplex (TDD) system, a structure of downlink and uplink may be an asymmetric structure in which an uplink bandwidth and a downlink bandwidth are different from each other. Alternatively, the structure of downlink and uplink may be configured in which an uplink bandwidth and a downlink bandwidth are identical to each other. In this case, the structure of downlink and uplink may be configured to a symmetric structure in which the same number of PHYs exist in both uplink and downlink transmissions or an asymmetric structure in which the number of PHY differs between uplink and downlink transmissions.

FIG. 6 shows an example of an asymmetric structure of downlink and uplink in a multi-carrier system. A transmission time interval (TTI) is a scheduling unit for information transmission. In each of the FDD system and the TDD system, a structure of downlink and uplink is an asymmetric structure. If the structure of downlink and uplink is an asymmetric structure, a specific link may have a higher information throughput. Therefore, system can be optimized flexibly.

Hereinafter, for convenience of explanation, it is assumed that a CC includes one PHY.

All transmission/reception methods used in a single carrier system using can also be applied to each CC of the transmitter and the receiver in a multi-carrier system. In addition, it is desirable for the multi-carrier system to maintain backward compatibility with the single carrier system which is legacy system of the multi-carrier system, This is because the provisioning of compatibility between the multi-carrier system and the single carrier system is advantageous in terms of user convenience, and is also advantageous for a service provider since existing equipment can be reused.

Now, a single carrier system will be described.

FIG. 7 shows a structure of a radio frame.

Referring to FIG. 7, the radio frame consists of 10 subframes. One subframe consists of two slots. Slots included in the radio frame are numbered with slot numbers #0 to #19. A time required to transmit one subframe is defined as a TTI. For example, one radio frame may have a length of 10 milliseconds (ms), one subframe may have a length of 1 ms, and one slot may have a length of 0.5 ms.

The structure of the radio frame is for exemplary purposes only, and thus the number of subframes included in the radio frame or the number of slots included in the subframe may change variously.

FIG. 8 shows an example of a resource grid for one downlink slot.

Referring to FIG. 8, the downlink slot includes a plurality of orthogonal frequency division multiplexing (OFDM) symbols in a time domain and $N^{DL}$ resource blocks (RBs) in a frequency domain. The OFDM symbol is for expressing one symbol period, and may be referred to as an orthogonal frequency division multiple access (OFDMA) symbol or a single carrier-frequency division multiple access (SC-FDMA) symbol according to a multiple access scheme. The number $N^{DL}$ of resource blocks included in the downlink slot depends on a downlink transmission bandwidth configured in a cell. One RB includes a plurality of subcarriers in the frequency domain.

Each element on the resource grid is referred to as a resource element (RE). Although it is described herein that one RB includes 7×12 resource elements consisting of 7 OFDM symbols in the time domain and 12 subcarriers in the frequency domain for example, the number of OFDM symbols and the number of subcarriers in the RB are not limited thereto. Thus, the number of OFDM symbols and the number of subcarriers may change variously depending on a cyclic prefix (CP) length, a subcarrier spacing, etc. For example, when using a normal CP, the number of OFDM symbols is 7, and when using an extended CP, the number of OFDM symbols is 6.

The resource grid for one downlink slot of FIG. 8 can be applied to a resource grid for an uplink slot.

FIG. 9 shows a structure of a radio frame and a subframe in a FDD system.

Referring to FIG. 9, the radio frame includes 10 subframes, and each subframe includes two consecutive slots. When using a normal CP, the subframe includes 14 OFDM symbols. When using an extended CP, the subframe includes 12 OFDM symbols. A SCH is transmitted in every radio frame. The SCH includes a primary (P)-SCH and a secondary (S)-SCH. The P-SCH is transmitted through a last OFDM symbol of a 1st slot of a subframe 0 and a subframe 5 in a radio frame. When using the normal CP, the P-SCH is an OFDM symbol 6 in the subframe, and when using the extended CP, the P-SCH is an OFDM symbol 5 in the subframe. The S-SCH is transmitted through an OFDM symbol located immediately before an OFDM symbol on which the P-SCH is transmitted.

A maximum of three OFDM symbols (i.e., OFDM symbols 0, 1, and 2) located in a front portion of a 1st slot in every subframe correspond to a control region. The remaining OFDM symbols correspond to a data region. A physical downlink shared channel (PDSCH) can be assigned to the data region. Downlink data is transmitted on PDSCH.

Control channels such as a physical control format indicator channel (PCFICH), a physical HARQ (hybrid automatic repeat request) indicator channel (PHICH), a physical downlink control channel (PDCCH) etc., can be assigned to the control region.

Resource element groups (REGs) are used for defining the mapping of a control channel to resource elements.

FIG. 10 shows an example of an REG structure when a BS uses one or two Tx antennas. FIG. 11 shows an example of an REG structure when a BS uses four Tx antennas. In FIGS. 10 and 11, it is assumed that a maximum of three OFDM symbols (i.e., OFDM symbols 0, 1, and 2) located in a front portion of a 1st slot in a subframe are control regions.

Referring to FIGS. 10 and 11, Rp indicates a resource element which is used to transmit a reference signal (hereinafter referred to as an 'RS') through antenna p (p∈{0, 1, 2, 3}). The RS may be also referred to as a pilot. One REG is composed of four adjacent resource elements in the frequency domain other than resource elements which are used for RS transmission. In the OFDM symbol 0 in the subframe, two REGs exist within one resource block in the frequency domain. It is to be noted that the above REG structures are only illustrative and the number of resource elements included in the REG may change in various ways.

The PHICH carries an HARQ acknowledgement (ACK)/not-acknowledgement (NACK) for uplink data.

The PCFICH carries information about the number of OFDM symbols used for transmission of PDCCHs in a subframe. Although the control region includes three OFDM symbols herein, this is for exemplary purposes only. According to an amount of control information, the PDCCH is transmitted through the OFDM symbol 0, or the OFDM symbols 0 and 1, or the OFDM symbols 0 to 2. The number of OFDM symbols used for PDCCH transmission may change in every subframe. The PCFICH is transmitted through a 1st OFDM symbol (i.e., the OFDM symbol 0) in every subframe. The PCFICH can be transmitted through a single antenna or can be transmitted through a multi-antenna using a transmit diversity scheme. When a subframe is received, the UE evaluates control information transmitted through the PCFICH, and then receives control information transmitted through the PDCCH.

The control information transmitted through the PCFICH is referred to as a control format indicator (CFI). For example, the CFI may have a value of 1, 2, or 3. The CFI value may represent the number of OFDM symbols used for PDCCH transmission in a subframe. That is, if the CIF value is 2, the number of OFDM symbols used for PDCCH transmission in a subframe is 2. This is for exemplary purposes only, and thus information indicated by the CFI may be defined differently according to a downlink transmission bandwidth. For example, if the downlink transmission bandwidth is less than a specific threshold value, the CFI values of 1, 2, and 3 may indicate that the number of OFDM symbols used for PDCCH transmission in the subframe is 2, 3, and 4, respectively.

The following table shows an example of a CFI and a 32-bit CFI codeword which generates by performing channel coding to the CFI.

TABLE 1

| CFI | CFI codeword <$b_0, b_1, \ldots, b_{31}$> |
|---|---|
| 1 | <0,1,1,0,1,1,0,1,1,0,1,1,0,1,1,0,1,1,0,1,1,0,1,1,0,1,1,0,1,1,0,1> |
| 2 | <1,0,1,1,0,1,1,0,1,1,0,1,1,0,1,1,0,1,1,0,1,1,0,1,1,0,1,1,0,1,1,0> |
| 3 | <1,1,0,1,1,0,1,1,0,1,1,0,1,1,0,1,1,0,1,1,0,1,1,0,1,1,0,1,1,0,1,1> |
| 4 (Reserved) | <0,0,0,0,0,0,0,0,0,0,0,0,0,0,0,0,0,0,0,0,0,0,0,0,0,0,0,0,0,0,0,0> |

The 32-bit CFI codeword can be mapped to a 16 modulated symbols using a quadrature phase shift keying (QPSK) scheme. In this case, 16 resource elements (or subcarriers) are used in PCFICH transmission. That is, 4 REGs are used in PCFICH transmission.

FIG. 12 shows an example of mapping of a PCFICH to REGs.

Referring to FIG. 12, the PCFICH is mapped to 4 REGs, and the respective REGs to which the PCFICH are mapped are spaced apart from one another. An REG to which the PCFICH is mapped may vary according to the number of resource blocks in a frequency domain. In order to avoid inter-cell interference of the PCFICH, the REGs to which the PCFICH is mapped may be shifted in a frequency domain according to a cell ID.

Now, a PDCCH will be described.

A control region consists of a set of control channel elements (CCEs). The CCEs are indexed 0 to N(CCE)−1, where N(CCE) is the total number of CCEs constituting the set of CCEs in a downlink subframe. The CCE corresponds to a plurality of REGs. For example, one CCE may correspond to 9 REGs. A PDCCH is transmitted on an aggregation of one or several consecutive CCEs. A PDCCH format and the possible number of bits of the PDCCH are determined according to the number of CCEs constituting the CCE aggregation. Hereinafter, the number of CCEs constituting the CCE aggregation used for PDCCH transmission is referred to as a CCE aggregation level. In addition, the CCE aggregation level is a CCE unit for searching for the PDCCH. A size of the CCE aggregation level is defined by the number of contiguous CCEs. For example, the CCE aggregation level may be an element of {1, 2, 4, 8}.

The following table shows an example of the PDCCH format, the number of REGs and the number of PDCCH bits.

TABLE 2

| PDCCH format | CCE aggregation level | Number of REGs | Number of PDCCH bits |
|---|---|---|---|
| 0 | 1 | 9 | 72 |
| 1 | 2 | 18 | 144 |

TABLE 2-continued

| PDCCH format | CCE aggregation level | Number of REGs | Number of PDCCH bits |
|---|---|---|---|
| 2 | 4 | 36 | 288 |
| 3 | 8 | 72 | 576 |

Control information transmitted on the PDCCH is referred to as downlink control information (DCI). The DCI transports uplink scheduling information, downlink scheduling information, or an uplink power control command, etc. The downlink scheduling information is also referred to as a downlink grant, and the uplink scheduling information is also referred to as an uplink grant.

FIG. 13 is a flow diagram showing an example of a method of transmitting data and receiving data performed by a UE.

Referring to FIG. 13, a BS transmits an uplink grant to a UE at step S11. The UE transmits uplink data to the BS based on the uplink grant at step S12. The uplink grant may be transmitted on a PDCCH, and the uplink data may be transmitted on a physical uplink shared channel (PUSCH). A relationship between a subframe in which a PDCCH is transmitted and a subframe in which a PUSCH is transmitted may be previously set between the BS and the UE. For example, if the PDCCH is transmitted in an nth subframe in a FDD system, the PUSCH may be transmitted in an (n+4)th subframe.

The BS transmits an downlink grant to the UE at step S13. The UE receives downlink data from the BS based on the downlink grant at step S14. The downlink grant may be transmitted on a PDCCH, and the downlink data may be transmitted on a PDSCH. For example, the PDCCH and the PDSCH are transmitted in the same subframe.

As described above, a UE shall receive DCI on PDCCH to receive downlink data from a BS or transmit uplink data to a BS.

DCI may use a different DCI format in accordance with usage. For example, a DCI format for an uplink grant and a DCI format for a downlink grant is different each other. A size and usage of DCI may differ according to a DCI format.

The following table shows an example of the DCI format.

TABLE 3

| DCI format | Objectives |
|---|---|
| 0 | Scheduling of PUSCH |
| 1 | Scheduling of one PDSCH codeword |
| 1A | Compact scheduling of one PDSCH codeword |
| 1B | Closed-loop single-rank transmission |
| 1C | Paging, RACH response and dynamic BCCH |
| 1D | MU-MIMO |
| 2 | Scheduling of closed-loop rank-adapted spatial multiplexing mode |
| 2A | Scheduling of open-loop rank-adapted spatial multiplexing mode |

TABLE 3-continued

| DCI format | Objectives |
| --- | --- |
| 3 | TPC commands for PUCCH and PUSCH with 2 bit power adjustments |
| 3A | TPC conunands for PUCCH and PUSCH with single bit power adjustments |

Referring to above table, a DCI format 0 is used for PUSCH scheduling. The DCI format 0 is used for an uplink grant.

A DCI format 1 is used for scheduling of one PDSCH codeword. A DCI format 1A is used for compact scheduling of one PDSCH codeword. A DCI format 1B is used for compact scheduling of one PDSCH codeword in a closed-loop rank 1 transmission mode. A DCI format 1C is used for paging, random access channel (RACH) response, and dynamic broadcast control channel (BCCH). A DCI format 1D is used for PDSCH scheduling in a multi-user (MU)-MIMO mode. A DCI format 2 is used for PDSCH scheduling in a closed-loop rank-adapted spatial multiplexing mode. A DCI format 2A is used for PDSCH scheduling in an open-loop rank-adapted spatial multiplexing mode. Each of from DCI format 1 to DCI format 2A is used for a downlink grant. However, the DCI format may differ according to a usage of DCI or transmission mode of a BS.

DCI formats 3 and 3A are used for transmission of a transmission power control (TPC) command for a physical uplink control channel (PUCCH) and a PUSCH. The DCI formats 3 and 3A is used for an uplink power control command.

Each DCI format consists of a plurality of information fields. The type of information fields constituting a DCI format, the size of each of the information fields, etc. may differ according to the DCI format. For example, a downlink grant (or an uplink grant) includes resource allocation field indicating radio resource. The downlink grant (or the uplink grant) may include further a modulation and coding scheme (MCS) field indicating modulation scheme and channel coding scheme. In addition, the downlink grant (or the uplink grant) may include further various information fields.

FIG. 14 is a flowchart showing an example of a method of configuring a PDCCH.

Referring to FIG. 14, in step S21, a BS generates information bit stream in accordance with a DCI format. In step S22, the BS attaches a cyclic redundancy check (CRC) for error detection to the information bit stream. The information bit stream may be used to calculate the CRC. The CRC is parity bits, and the CRC may be attached in front of the information bit stream or at the back of the information bit stream.

The CRC is masked with an identifier (referred to as a radio network temporary identifier (RNTI)) according to an owner or usage of the DCI. The masking may be scrambling of the CRC with the identifier. The masking may be an modulo 2 operation or exclusive or (XOR) operation between the CRC and the identifier.

If the DCI is for a specific UE, a unique identifier (e.g., cell-RNTI (C-RNTI)) of the UE may be masked onto the CRC. The C-RNTI may be also referred to as a UE ID. The CRC can be masked with different RNTI except C-RNTI, such as paging-RNTI (P-RNTI) for a paging message, system information-RNTI (SI-RNTI) for system information, random access-RNTI (RA-RNTI) for indicating random access response which is response of random access preamble transmitted by a UE, etc.

In step S23, the BS generates coded bit stream by performing channel coding to the information bit stream attached the CRC. The channel coding scheme is not limited. For example, convolution coding scheme can be used. The number of PDCCH bits may differ in accordance with channel coding rate.

In step of S24, the BS generates rate matched bit stream by performing rate matching to the coded bit stream. In step of S25, the BS generates modulated symbols by modulating the rate matched bit stream. In step of S26, the BS maps the modulated symbols to resource elements.

As described above, a method of configuring one PDCCH is explained. However, a plurality of control channels may be transmitted in a subframe. That is, a plurality of PDCCHs for several UEs can be transmitted by being multiplexed in one subframe. Generation of information bit stream, CRC attachment, channel coding, and rate matching, etc. are performed independently for each PDCCH. The aforementioned process of configuring the PDCCH of FIG. 14 can be performed independently for each PDCCH.

FIG. 15 shows an exemplary structure of a UL subframe.

Referring to FIG. 15, the UL subframe may be divided into a control region allocated to a physical uplink control channel (PUCCH) carrying UL control information and a data region allocated to a physical uplink shared channel (PUSCH) carrying user data. To maintain a single carrier property in a UL, consecutive RBs in a frequency domain are allocated to one UE. One UE cannot simultaneously transmit the PUCCH and the PUSCH.

The PUCCH for one UE is allocated to an RB pair in a subframe. RBs belonging to the RB pair occupy different subcarriers in each of the two slots. In this case, it is said that the RB pair allocated to the PUCCH is subject to frequency hopping at a slot boundary. In FIG. 6, m denotes a location index indicating a frequency domain location of an RB pair allocated to the PUCCH in the subframe.

The PUSCH is mapped to an uplink shared channel (UL-SCH) that is a transport channel. Examples of UL control information transmitted on the PUCCH include a hybrid automatic repeat request (HARM) acknowledgement (ACK)/not-acknowledgement (NACK), a channel quality indicator (CQI) indicating a DL channel condition, a scheduling request (SR) that is a UL radio resource allocation request, etc.

The CQI can be used for link adaptation. The UE can report a CQI to the BS by measuring a DL channel condition. For example, the CQI can indicate a modulation and coding scheme (MCS) level. The BS can perform DL scheduling by using the CQI. The UE can feed back a precoding matrix indicator (PMI), a rank indicator (RI), etc. in addition to the CQI. The PMI indicates index of precoding matrix selected from a codebook. The RI indicates the number of useful transmission layers. Hereinafter, the CQI is a concept comprising the PMI and RI in addition to the CQI.

CQI transmission is periodic or aperiodic.

A UE may transmit periodic CQI on PUCCH in a subframe with no PUSCH allocation. A UE may transmit periodic CQI on PUSCH in a subframe with PUSCH allocation, where the UE may use the same PUCCH-based periodic CQI format on PUSCH. A UE may transmit aperiodic CQI on PUSCH.

First, the CQI which is periodically transmitted is described below.

The following table indicates an example of CQIs and PMI feedback types which are transmitted on a PUCCH according to reporting modes.

TABLE 4

|  |  | PMI Feedback Type | |
| --- | --- | --- | --- |
|  |  | No PMI | Single PMI |
| PUCCH CQI Feedback Type | Wideband (wideband CQI) | Mode 1-0 | Mode 1-1 |
|  | UE Selected (subband CQI) | Mode 2-0 | Mode 2-1 |

Referring to above table, in the case of the mode 1-0, a UE feeds back only a wideband CQI without a PMI. In the case of the mode 1-1, a UE feeds back a single PMI and a wideband CQI. In the case of the mode 2-0, a UE feeds back a subband CQI selected by the UE without a PMI. In the case of the mode 2-1, a UE feeds back a single PMI and a subband CQI selected by the UE.

As described above, various forms of CQI and/or PMI can be fed back according to the reporting modes. Further, a CQI may feed back a channel state for the entire band or a channel state for a subband (i.e., part of the entire band) according to the reporting modes.

The reporting mode may be configured by higher layer signaling, such as radio resource control (RRC) signaling. In this case, the reporting mode is semi-statically configured.

A UE generates CQI information bits in accordance with a reporting mode. The CQI information bits may comprise a PMI, a RI in addition to a CQI. The UE performs channel coding on CQI information bits to generate coded CQI bits. In this case, the coded CQI bits has a fixed size. For example, if a block code (20, A) is used, the generated coded CQI bits always has a size of 20 bits irrespective of a size of the CQI information bits, where A is the size of the CQI information bit. The coded CQI bits is modulated according to a predetermined modulation scheme, and thus modulated symbols are generated. In this case, the modulation scheme may be quadrature phase shift keying (QPSK). For example, the coded CQI bits having a size of 20 bits may be generated into 10 modulated symbols using QPSK. The modulated symbols are transmitted on a PUCCH.

The UE transmits CQI on PUCCH based on a resource index. The resource index identifies a resource used for transmission of CQI. The resource used for transmission of CQI is a resource block and a sequence. The resource block is a frequency resource used for transmission of CQI. Each of the CQI modulated symbols spreads with the sequence in a frequency domain. For example, the each of the CQI modulated symbols is multiplied with the sequence. The sequence may be a cyclically shifted sequence, the cyclically shifted sequence which is generated by cyclically shifting a base sequence by a specific cyclic shift (CS) amount. In this case, the resource index may indicate the specific CS amount.

As described above, a transport format of a periodic CQI is fixed, such as in a channel coding scheme, a modulation scheme, etc., and it is referred to as a PUCCH-based periodic CQI format. The UE can also transmit a periodic CQI on the PUSCH by using the PUCCH-based periodic CQI format. As such, the period CQI uses the PUCCH-based periodic CQI format. Therefore, the periodic CQI has a fixed transport format and a limited transmissible CQI information amount.

Each of a transmit cycle for a periodic CQI and a resource index for the CQI may be semi-statically configured by higher layer signaling, such as RRC signaling.

In order to increase the flexibility of CQI transmission, a CQI needs to be aperiodically transmitted as well as periodically.

A CQI that is aperiodically transmitted is described below.

The following table illustrates an example of CQIs and PMI feedback types which are transmitted on a PUSCH according to reporting modes.

TABLE 5

|  |  | PMI Feedback Type | | |
| --- | --- | --- | --- | --- |
|  |  | No PMI | Single PMI | Multiple PMI |
| PUSCH CQI Feedback Type | Wideband (wideband CQI) |  |  | Mode 1-2 |
|  | UE Selected (subband CQI) | Mode 2-0 |  | Mode 2-2 |
|  | Higher Layer-configured (subband CQI) | Mode 3-0 | Mode 3-1 |  |

Referring to above table, in the case of the mode 2-0, a UE feeds back a subband CQI that is selected by the US without a PMI. In the case of the mode 3-0, a UE feeds back a subband CQI that is configured by a higher layer without a PMI. In the case of the mode 3-1, a UE feeds back a single PMI and a subband CQI that is configured by a higher layer. In the case of the mode 1-2, a UE feeds back a multi-PMI and a wideband CQI. In the case of the mode 2-2, a UE feeds back a multi-PMI and a subband CQI that is selected by the UE.

As described above, the granularity of the frequency domain of a CQI and/or a PMI may change according to the reporting modes. Further, feedback overhead and system performance may vary according to the reporting modes. A BS may configure an appropriate reporting mode according to the mobile speed of a UE, an MIMO channel state, and so on in order to optimize the system. The reporting modes may be semi-statically configured by higher layer signaling, such as RRC.

FIG. 16 is a flow diagram showing an example of a method of aperiodically transmitting a CQI.

Referring to FIG. 16, a BS transmits a UL grant requesting an aperiodic report of a CQI to a UE on a PUCCH (step S31). The UE transmits a CQI on a PUSCH based on the UL grant (step S32). The UL grant includes a CQI request field indicating whether a CQI is requested. If the CQI request field indicates requesting a CQI, an aperiodic CQI feedback is triggered. As such, the aperiodic CQI can be fed back by the request of the BS.

A frame structure of a single carrier system, a PDCCH transmission and monitoring method, etc., have been described above. For optimization of a multi-carrier system, a multi-antenna scheme or a control channel shall be designed by considering a frequency channel property for each CC. Therefore, it is important to properly use a system parameter and an optimal transmission/reception scheme for each CC. In addition, the same frame structure as a legacy system may be used in one CC of the multi-carrier system. In this case, the control channel shall be properly modified to operate both a UE for the legacy system and a UE for the multi-carrier system. Hereinafter, the UE for the legacy system is referred to as a long term evolution (LTE) UE, and the UE for the multi-carrier system is referred to as an LTE-advanced (LTE-A) UE.

In a multi-carrier system, in the case where an LTE-A UE is allocated with a plurality of downlink component carriers (DL CCs), the LTE-A UE must be able to transmit uplink control information for each of the DL CCs. In particular, if a CQI for each DL CC is fed back, link adaptation can be efficiently applied to a channel, and the system can be optimized. Accordingly, there is a need for a method of efficiently transmitting uplink control information for each DL CC.

A multi-carrier system may be classified into a symmetric structure and an asymmetric structure. The symmetric structure has a structure in which the number of DL CCs is equal to the number of UL CCs. The asymmetric structure has a structure in which the number of DL CCs is different from the number of UL CCs.

First, a case where a multi-carrier system has the symmetric structure is described below.

FIG. 17 shows an example of a linking method between DL CCs and UL CCs in a multi-carrier system having the symmetric structure.

Referring to FIG. 17, the number of DL CCs is L, and the number of UL CCs is L which is equal to the number of DL CCs. A DL CC #n is linked to a UL CC #n (n=1, 2, . . . , L). That is, a plurality of DL CCs is mapped to a plurality of UL CCs in a one-to-one manner.

The meaning of the linking between DL CCs and UL CCs is described below. First, downlink control information for a UL CC can be transmitted through a DL CC which is linked to the UL CC. For example, if a UL grant is transmitted through a DL CC #n, UL data can be transmitted through a UL CC #n which is linked to the DL CC #n on the basis of the UL grant. Further, HARQ ACK/NACK for UL data which is transmitted through a UL CC #n can be transmitted through a DL CC #n.

Second, uplink control information for a DL CC can be transmitted through a UL CC which is linked to the DL CC. For example, a CQI for a DL CC #n can be transmitted through a UL CC #n linked to the DL CC #n. HARQ ACK/NACK for downlink data which is transmitted through a DL CC #n can be transmitted to a UL CC #n.

A method of transmitting uplink control information can be classified as in the following table according to the type of a physical channel and whether uplink control information is periodically transmitted.

TABLE 6

|  | PERIODIC | APERIODIC |
| --- | --- | --- |
| PUCCH | P_PUCCH | A_PUCCH |
| PUSCH | P_PUSCH | A_PUSCH |

Hereinafter, a PUCCH that is periodically transmitted is referred to as a P_PUCCH, and a PUCCH that is aperiodically transmitted is referred to as an A_PUCCH. Further, a PUSCH that is periodically transmitted is referred to as a P_PUSCH, and a PUSCH that is aperiodically transmitted is referred to as an A_PUSCH. For example, uplink control information transmitted on the P_PUCCH or the P_PUSCH may include a CQI and an SR. Uplink control information transmitted on the A_PUCCH may include HARQ ACK/NACK. Uplink control information transmitted on the A_PUSCH may include an aperiodic CQI which is transmitted at the request of a BS.

A wireless communication system may be configured to support only a specific one of four methods of transmitting uplink control information. For example, a wireless communication system may be configured to support only the P_PUCCH, the P_PUSCH, and the A_PUSCH.

Transmission of the P_PUCCH/the P_PUSCH is described below. Hereinafter, the P_PUCCH/the P_PUSCH means each of the P_PUCCH and the P_PUSCH. The P_PUCCH/the P_PUSCH may be periodically transmitted every UL CC. Here, the transmit cycles of the P_PUCCH/the P_PUSCH on a UL CC basis may be synchronized with each other.

FIG. 18 shows an example in which the transmit cycles of a P_PUCCH/a P_PUSCH on a UL CC basis are synchronized with each other.

Referring to FIG. 18, each of the transmit cycles of the P_PUCCH/the P_PUSCH for a plurality of UL CCs is 3 TTI.

FIG. 19 shows another example in which transmit cycles of a P_PUCCH/a P_PUSCH on a UL CC basis are synchronized with each other.

Referring to FIG. 19, the transmit cycle of a P_PUCCH/a P_PUSCH of a UL CC #1 is 3 TTI, the transmit cycle of a P_PUCCH/a P_PUSCH of a UL CC #2 is 6 TTI, and the transmit cycle of a P_PUCCH/a P_PUSCH of a UL CC #U is 9 TTI. The transmit cycles of a P_PUCCH/a P_PUSCH for a plurality of UL CCs differ from each other. However, the transmit cycle of a P_PUCCH/a P_PUSCH for a plurality of UL CCs is a multiple of the transmit cycle of a P_PUCCH/a P_PUSCH of a reference UL CC (e.g., a UL CC #1).

In the case where, as in FIGS. 18 and 19, the transmit cycles of the P_PUCCH/the P_PUSCH on a UL CC basis are synchronized with each other, uplink control information can be efficiently transmitted. A UE can efficiently transmit uplink control information by configuring a multi-PUCCH. The term 'multi-PUCCH' includes a number of PUCCHs and means that P_PUCCHs of respective UL CCs transmitted at the same time are bundled together and transmitted through a single UL CC. The UE may configure a plurality of multi-PUCCHs and transmit the multi-PUCCHs through different UL CCs.

In order to describe a method of configuring a multi-PUCCH, a PUCCH transmission method in a LTE (Release 8) system is first described.

As described above with reference to the PUCCH-based periodic CQI format, a resource used for CQI transmission includes a resource block and a sequence. In the case where the sequence is a cyclic shifted sequence, a resource index indicating a resource determines a resource block and a cyclic shift index which are used for PUCCH transmission. The cyclic shift index is indicating the CS amount.

A Resource which is used to transmit a HARQ ACK/NACK (or an SR) on a PUCCH includes a resource block, a first sequence, and a second sequence. The first sequence is used to spread a symbol for a HARQ ACK/NACK (or an SR) in a frequency domain, and the second sequence is used to spread the symbol which is spread in the frequency domain by the first sequence in a time domain. The first sequence may be a cyclic shifted sequence, and the second sequence may be an orthogonal sequence that is selected from an orthogonal sequence set comprising orthogonal sequences. In this case, the resource index determines a resource block, a cyclic shift index, and an orthogonal sequence index which are used for PUCCH transmission. The orthogonal sequence index indicates an orthogonal sequence selected from the orthogonal sequence set.

If, although a plurality of UEs within a cell transmits PUCCHs through the same resource block at the same time, they use different sequences, a BS can identify the PUCCHs transmitted by the respective UEs.

The following table shows an example of resources which can be used for PUCCH transmission within a resource block.

TABLE 7

| Ics | Ios = 0 | Ios = 1 | Ios = 2 |
|---|---|---|---|
| 0 | 0 | | 4 |
| 1 | | 2 | |
| 2 | 1 | | 5 |
| 3 | | 3 | |
| 4 | | N/A | |
| 5 | | resource index #1 for CQI | |
| 6 | | resource index #2 for CQI | |
| 7 | | resource index #3 for CQI | |
| 8 | | resource index #4 for CQI | |
| 9 | | resource index #5 for CQI | |
| 10 | | resource index #6 for CQI | |
| 11 | | N/A | |

Referring to above table, the cyclic shift indices 0 to 3 of the 12 cyclic shift indices are used as PUCCH resources for HARQ ACK/NACK and or an SR. The cyclic shift indices 5 to 10 are used as PUCCH resources for CQIs. N/A indicates an unallocated cyclic shift index. The unallocated cyclic shift index refers to a cyclic shift index that is not allocated to any UE within a cell. The unallocated cyclic shift index may also be referred to as a guard shift.

The resource indices 0 to 5 identify resources which are used for PUCCH transmission of HARQ ACK/NACK and/or SR transmission within a resource block. A BS can receive six PUCCHs for HARQ ACK/NACK and/or an SR which are transmitted by a maximum of six UEs and six PUCCHs for CQIs which are transmitted by a maximum of six UEs through a resource block.

FIG. 20 is a flowchart illustrating a method of a UE transmitting PUCCHs in a multi-antenna system.

Referring to FIG. 20, the UE acquires a first resource index and a second resource index at step S41. The UE transmits a first PUCCH to a BS through a first antenna on the basis of the first resource index and at the same time transmits a second PUCCH to the BS through a second antenna on the basis of the second resource index at step S120. Here, the first PUCCH and the second PUCCH are transmitted through a single UL CC. The first resource index identifies a first resource used to transmit the first PUCCH, and the second resource index identifies a second resource used to transmit the second PUCCH.

First control information carried on the first PUCCH may be the same as or different from second control information carried on the second PUCCH. A multi-PUCCH transmission method when the first control information is the same as the second control information is called an orthogonal resource transmit diversity (ORTD) method. A diversity gain can be obtained through the ORTD method. A multi-PUCCH transmission method when the first control information is different from the second control information is called an orthogonal resource spatial multiplexing (ORSM) method. The information transmission rate can be increased through the ORSM method.

Each of the ORTD method and the ORSM method may expand and apply to three or more antennas. The UE may be allocated with different N resource indices (where N is a natural number greater than 2). The UE can transmit an N number of PUCCHs through an N number of antennas on the basis of the N resource indices.

FIG. 21 is a block diagram showing an example of a transmitter structure in which the ORTD method is implemented. Here, the transmitter may be part of a UE.

Referring to FIG. 21, the transmitter 100 includes a first PUCCH unit 110-1, a second PUCCH unit 110-2, and first and second antennas 190-1 and 190-2. The first antenna 190-1 is coupled to the first PUCCH unit 110-1, and the second antenna 190-2 is coupled to the second PUCCH unit 110-2. The same symbol S(1) is input to the first PUCCH unit 110-1 and the second PUCCH unit 110-2. The symbol S(1) is one or more symbols for uplink control information. The first PUCCH unit 110-1 generates a first PUCCH on the basis of the symbol S(1) and a first resource index. The second PUCCH unit 110-2 generates a second PUCCH on the basis of the symbol S(1) and a second resource index. The first PUCCH is transmitted through the first antenna 190-1 and, at the same time, the second PUCCH is transmitted through the second antenna 190-2.

FIG. 22 is a block diagram showing an example of a transmitter structure in which the ORSM method is implemented. Here, the transmitter may be part of a UE.

Referring to FIG. 22, the transmitter 200 includes a first PUCCH unit 210-1, a second PUCCH unit 210-2, and first and second antennas 290-1 and 290-2. A symbol S(1) is input to the first PUCCH unit 210-1, and a symbol S(2) is input to the second PUCCH unit 210-2. The symbol S(1) is one or more symbols for first uplink control information, and the symbol S(2) is one or more symbols for second uplink control information. The remaining description is the same as the transmitter of FIG. 20 except that different symbols are applied to the first PUCCH unit 210-1 and the second PUCCH unit 210-2.

A multi-PUCCH can be configured using the ORTD method and the ORSM method properly.

FIG. 23 shows an example in which the transmit cycles of a P_PUCCH/a P_PUSH on a UL CC basis are synchronized with each other and accordingly a multi-PUCCH is transmitted.

Referring to FIG. 23, multi-PUCCH which includes a P_PUCCH/P_PUSCH for UL CC #1 and a P_PUCCH/P_PUSCH for UL CC #2 is transmitted through UL CC #1 at each of T #1 and T #7. The multi-PUCCH may be transmitted using the ORSM method.

A P_PUCCH/P_PUSCH for UL CC #1 is transmitted through UL CC #1 at each of T #4 and T #10. In this case, the P_PUCCH/P_PUSCH may be transmitted using the ORTD method or the PUCCH transmission method in a LTE (Release 8) system In the case where a P_PUCCH and a P_PUSCH have to be transmitted at the same time, the P_PUCCH may be piggybacked to the P_PUSCH and then transmitted. This method enables localized uplink transmission and thus low-power transmission of a UE.

A UE can transmit uplink control information using an A_PUSCH/an A_PUCCH. Hereinafter, the A_PUSCH/the A_PUCCH means each of the A_PUSCH and the A_PUCCH.

FIG. 24 shows an example in which an A_PUSCH and P_PUSCH/P_PUCCH are transmitted in a multi-carrier system.

Referring to FIG. 24, there may be a case where an A_PUSCH and a P_PUSCH/P_PUCCH have to be transmitted at the same time.

An efficient transmission method in the case where an A_PUSCH/A_PUCCH and a P_PUSCH/P_PUCCH have to be transmitted at the same time is described below.

The P_PUSCH/P_PUCCH is transmitted on a predetermined time through higher layer signaling, whereas the A_PUSCH is fed back at the request of a BS. In general, the A_PUSCH is used when a large amount of uplink control information is fed back. Accordingly, uplink control information transmitted on the P_PUSCH/P_PUCCH can be repeated. In this case, such redundant transmission of uplink control information can be reduced and overhead can be minimized through a variety of methods.

(1) P_PUSCH/P_PUCCH Dropping

In the case where an A_PUSCH has to be transmitted simultaneously with a P_PUSCH/P_PUCCH, the P_PUSCH/P_PUCCH may not be transmitted in order to avoid redundant transmission. This method is called P_PUSCH/P_PUCCH dropping. Alternatively, the P_PUSCH may be dropped, whereas the P_PUCCH may be piggybacked to the A_PUSCH and then transmitted. In this case, the P_PUCCH can be separately coded to a specific region on which the A_PUSCH is transmitted and then transmitted.

(2) A_PUCCH Piggyback

PUCCH transmission used to carry HARQ ACK/NACK information is triggered from downlink data that is transmitted on a PDSCH. Accordingly, in the case where an A_PUCCH, together with a P_PUSCH/P_PUCCH/A_PUSCH, must be transmitted, the P_PUCCH is dropped, and the A_PUCCH is primarily transmitted. In the case where the A_PUCCH, together with the P_PUSCH/A_PUSCH, must be transmitted, the A_PUCCH can be piggybacked to a region on which PUSCHs are transmitted and is then transmitted.

A multi-carrier system having a symmetric structure has so far been described.

Hereinafter, a case where a multi-carrier system has an asymmetric structure is described. An asymmetric structure corresponds to a case where the number of DL CCs differs from the number of UL CCs.

An asymmetric structure may have a problem in transmitting or receiving downlink control information or uplink control information. Accordingly, there is a need for a method of increasing the capacity of a downlink control channel or an uplink control channel in a multi-carrier system having an asymmetric structure.

First, a method of transmitting or receiving downlink control information is described below.

(1) PHICH

A case where the number of UL CCs is greater than the number of DL CCs is first described.

In order to implement an appropriate HARQ process using a small number of DL CCs for a large number of UL CCs, the capacity of a PHICH must be increased as compared with a symmetric structure. However, it is difficult to increase the capacity of a PHICH.

First, if UL data received through a number of UL CCs at the same time is successfully decoded, a BS transmits ACK on a PHICH. If the UL data received through at least one of the UL CCs is not successfully decoded, the BS transmits NACK on the PHICH.

A UE that has received the NACK on the PHICH determines that error has occurred in at least one of the above UL CCs. The UE retransmits the UL data through all the UL CCs. In this case, there is a problem in that overhead is great because the UL data must be retransmitted through all the UL CCs although there is error in one UL CC.

Second, the BS indicates only whether error has occurred in a number of UL CC on the PHICH. Further, the BS indicates which UL CC has error on a PDCCH. A HARQ process for a number of UL CCs can be effectively controlled through a small number of DL CCs using the PHICH and the PDCCH.

Next, a case where the number of DL CCs is greater than the number of UL CCs is described.

In this case, it is necessary to indicate that a PHICH for a small number of UL CCs is transmitted through which one of a number of DL CCs. In this case, the UL CCs can be mapped to the respective DL CCs, and the PHICH can be the transmitted. Alternatively, a number of PHICHs may be allocated to a specific DL CC.

(2) UL Grant

In the case of an asymmetric structure, it is necessary to indicate that a PDCCH on which a UL grant for each UL CC is carried is transmitted through which DL CC. In this case, a number of UE IDs can be assigned to a single UE. The UE IDs indicate the respective UL CCs. A BS can mask a UE ID, indicating a specific UL CC, to a CRC when transmitting a UL grant on the PDCCH.

Incidentally, a plurality of UL grants which is masked with different UE IDs for a single UE can be transmitted through a single DL CC. In the case where the number of DL CCs is smaller than the number of UL CCs, PDCCHs for a plurality of UL CCs can be transmitted through a single DL CC. Accordingly, resources can be allocated without any problem although a PDCCH is configured based on blind decoding.

A method of transmitting or receiving uplink control information is described below.

(1) ACK/NACK Bundling

A case where the number of DL CCs is greater than the number of UL CCs is described below.

In order to transmit a number of HARQ ACK/NACK for a number of DL CCs on a PUCCH through a small number of UL CCs, a number of ACK/NACK channels must be able to be transmitted. In this case, the HARQ ACK/NACK can be transmitted through a PUSCH because it is difficult to increase the capacity of the existing ACK/NACK channel. Alternatively, the HARQ ACK/NACK is transmitted on the PUCCH, but the HARQ ACK/NACK may indicate that there is error in one or more of the DL CCs. Which one of the DL CCs has error can be indicated on a next subframe or the PUSCH. Alternatively, a number of ACK/NACK channels for multiple CCs in a subframe may be sequentially allocated through multiple subfames and then transmitted through the PUCCH.

(2) Multi-PUCCH

A case where the number of DL CCs is greater than the number of UL CCs is described below. In this case, a multi-PUCCH can be configured by grouping PUCCHs for a number of DL CCs through a specific UL CC, and the configured multi-PUCCH can be transmitted. Further, a PUCCH for a single DL CC can be transmitted through another UL CC.

FIG. 25 shows an example of a linking method between DL CCs and UL CCs in a multi-carrier system having the asymmetric structure.

Referring to FIG. 25, a UE is allocated five DL CCs (DL CC #1, DL CC #2, . . . , DL CC #5) and three UL CCs (UL CC #1, UL CC #2, and UL CC #3). A multi-PUCCH which is configured by grouping three PUCCHs for the DL CC #1, the DL CC #2, and the DL CC #3 is transmitted through the UL CC #1. A_PUCCH for the DL CC #4 can be transmitted through the UL CC #2, and a PUCCH for the DL CC #5 can be transmitted through the UL CC #3.

FIG. 26 is a flowchart showing method of transmitting control information, performed by a UE, according to an embodiment of the present invention.

Referring to FIG. 26, a UE transmits first control information and second control information to a BS through a UL CC at step S110. The first control information is for a first DL CC, and the second control information is for a second DL CC.

FIG. 27 is a block diagram showing wireless communication system to implement an embodiment of the present invention. A BS 50 may include a processor 51, a memory 52 and a radio frequency (RF) unit 53. The processor 51 may be configured to implement proposed functions, procedures and/or methods described in this description. Layers of the radio interface protocol may be implemented in the processor 51. The memory 52 is operatively coupled with the processor 51 and stores a variety of information to operate the processor 51. The RF unit 53 is operatively coupled with the processor 11, and transmits and/or receives a radio signal. A UE 60 may include a processor 61, a memory 62 and a RF unit 63. The processor 61 may be configured to implement proposed functions, procedures and/or methods described in this description. The memory 62 is operatively coupled with the processor 61 and stores a variety of information to operate the processor 61. The RF unit 63 is operatively coupled with the processor 61, and transmits and/or receives a radio signal.

The processors 51, 61 may include application-specific integrated circuit (ASIC), other chipset, logic circuit, data processing device and/or converter which converts a baseband signal into a radio signal and vice versa. The memories 52, 62 may include read-only memory (ROM), random access memory (RAM), flash memory, memory card, storage medium and/or other storage device. The RF units 53, 63 include one or more antennas which transmit and/or receive a radio signal. When the embodiments are implemented in software, the techniques described herein can be implemented with modules (e.g., procedures, functions, and so on) that perform the functions described herein. The modules can be stored in memories 52, 62 and executed by processors 51, 61. The memories 52, 62 can be implemented within the processors 51, 61 or external to the processors 51, 61 in which case those can be communicatively coupled to the processors 51, 61 via various means as is known in the art.

As described above, a method and an apparatus of effectively transmitting control information are provided. A UE can transmit a multi-PUCCH through a single UL CC. Accordingly, a frequency bandwidth for PUCCH transmission can be reduced. Consequently, power consumption of a UE can be reduced and, therefore, the entire system performance can be improved.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

The invention claimed is:

1. A method of transmitting an acknowledgement (ACK)/negative acknowledgement (NACK) from a user equipment (UE) supporting carrier aggregation in a multiple carrier system, the method comprising:
   receiving, by a UE, a first downlink (DL) channel on a first DL component carrier (CC) and a second DL channel on a second DL CC;
   determining, by the UE, a single uplink (UL) CC used for transmitting feedback information for the first DL channel and the second DL channel via a physical uplink control channel (PUCCH); and
   transmitting, by the UE to a base station (BS), an ACK/NACK feedback indicating both ACK/NACK information for the first DL channel and ACK/NACK information for the second DL channel on the single UL CC,
   wherein the ACK/NACK feedback is transmitted both on a first PUCCH resource of a first antenna port and on a second PUCCH resource of a second antenna port, and
   wherein the first antenna port and the second antenna port are configured for the UE.

2. The method of claim 1, wherein the ACK/NACK feedback includes a channel quality indicator (CQI) of at least one of the first DL channel and the second DL channel.

3. The method of claim 2, further comprising:
   receiving, from the BS, a periodicity of the CQI,
   wherein the CQI is transmitted on the PUCCH periodically.

4. The method of claim 3, wherein the resource used for the transmission of the PUCCH is determined by the BS.

5. A mobile station for transmitting an acknowledgement (ACK)/negative acknowledgement (NACK) in a multiple carrier system, comprising:
   a radio frequency (RF) unit configured to:
      support carrier aggregation associated with a plurality of downlink (DL) component carriers (CCs); and
      receive a first downlink (DL) channel on a first DL component carrier (CC) and a second DL channel on a second DL CC; and
   a processor operably coupled with the RF unit and configured to:
      determine a single uplink (UL) CC used for transmitting feedback information for a first DL channel and a second DL channel via a physical uplink control channel (PUCCH); and
      transmit, to a base station (BS), an ACK/NACK feedback indicating both ACK/NACK information for the first DL channel and ACK/NACK information for the second DL channel on the single UL CC,
      wherein the ACK/NACK feedback is transmitted both on a first PUCCH resource of a first antenna port and on a second PUCCH resource of a second antenna port, and
      wherein the first antenna port and the second antenna port are configured for the mobile station.

6. The mobile station of claim 5, wherein the ACK/NACK feedback includes a channel quality indicator (CQI) of at least one of the first DL channel and the second DL channel.

7. The mobile station of claim 6, wherein the RF unit is further configured to:

receive, from the BS, a periodicity of the CQI,
wherein the CQI is transmitted on the PUCCH periodically.

8. The mobile station of claim 7, wherein the resource used for the transmission of the PUCCH is determined by the BS.

* * * * *